US010904804B2

(12) United States Patent
Guo et al.

(10) Patent No.: US 10,904,804 B2
(45) Date of Patent: *Jan. 26, 2021

(54) HANDOVER MEASUREMENT CONTROL METHOD AND APPARATUS

(71) Applicant: Sony Corporation, Tokyo (JP)

(72) Inventors: Xin Guo, Beijing (CN); Yuxin Wei, Beijing (CN); Jinhui Chen, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,589

(22) Filed: Jun. 10, 2019

(65) Prior Publication Data

US 2019/0297543 A1    Sep. 26, 2019

Related U.S. Application Data

(63) Continuation of application No. 15/544,927, filed as application No. PCT/CN2016/071950 on Jan. 25, 2016, now Pat. No. 10,356,672.

(30) Foreign Application Priority Data

Jan. 30, 2015 (CN) .......................... 2015 1 0049965

(51) Int. Cl.
*H04W 4/00* (2018.01)
*H04W 36/00* (2009.01)
(Continued)

(52) U.S. Cl.
CPC ....... *H04W 36/0083* (2013.01); *H04W 24/00* (2013.01); *H04W 36/00* (2013.01);
(Continued)

(58) Field of Classification Search
None
See application file for complete search history.

(56) References Cited

U.S. PATENT DOCUMENTS 9,554,406 B2  1/2017  Lin et al.
9,992,815 B2  6/2018  Chen et al.
(Continued)

FOREIGN PATENT DOCUMENTS

CN    102769879 A    11/2012
CN    102905307 A     1/2013
CN    103974275 A     8/2014

OTHER PUBLICATIONS

International Search Report dated Apr. 1, 2016 in PCT/CN2016/071950 filed Jan. 25, 2016.

*Primary Examiner* — Elisabeth Benoit Magloire
(74) *Attorney, Agent, or Firm* — Xsensus LLP

(57) ABSTRACT

An apparatus and a method in a wireless communication system. In the wireless communication system, a master device provides a data forwarding service for one or plural slave devices, a master device side apparatus including: a monitoring unit, configured to monitor a predetermined trigger event relating to a change in state of the master device; a handover pre-measurement control unit, configured to respond to the predetermined trigger event by controlling the handover pre-measurement of the one or plural slave devices; and a handover measurement control unit, configured to control, based on the handover premeasurement results, the handover measurement of the one or plural slave devices. The apparatus and method can accelerate start time of effective link handover in a dynamic network, reduce unnecessary link handover, and reduce delays and data loss caused by link failure.

10 Claims, 19 Drawing Sheets

(51) Int. Cl.
    *H04W 24/00*   (2009.01)
    *H04B 17/309*   (2015.01)
    *H04W 76/23*   (2018.01)
    *H04W 4/02*   (2018.01)
    *H04W 36/24*   (2009.01)

(52) U.S. Cl.
    CPC ........... *H04B 17/309* (2015.01); *H04W 4/023* (2013.01); *H04W 36/24* (2013.01); *H04W 76/23* (2018.02)

(56) References Cited

U.S. PATENT DOCUMENTS

| | | | |
|---|---|---|---|
| 2009/0054066 A1* | 2/2009 | Jang | H04W 36/0038 455/436 |
| 2009/0163206 A1* | 6/2009 | Adatrao | H04W 36/0085 455/436 |
| 2014/0349694 A1* | 11/2014 | Raghothaman | H04W 72/04 455/509 |
| 2015/0105084 A1* | 4/2015 | Bontu | H04W 36/0072 455/437 |
| 2015/0163705 A1 | 6/2015 | Lu et al. | |
| 2015/0358890 A1 | 12/2015 | Xu et al. | |
| 2016/0021594 A1 | 1/2016 | Yilmaz et al. | |
| 2016/0134761 A1* | 5/2016 | Campbell | H04W 48/18 370/259 |
| 2016/0323868 A1 | 11/2016 | Kalhan et al. | |
| 2017/0006560 A1 | 1/2017 | Siomina et al. | |
| 2017/0013516 A1* | 1/2017 | Tan Bergstrom | H04W 36/0055 |
| 2017/0026960 A1* | 1/2017 | Mestanov | H04W 72/0426 |
| 2017/0188411 A1 | 6/2017 | Siomina et al. | |

\* cited by examiner

HANDOVER MEASUREMENT CONTROL METHOD AND APPARATUS

CROSS-REFERENCE TO RELATED APPLICATIONS

This application is a continuation of U.S. application Ser. No. 15/544,927, filed Jul. 20, 2017, which is based on PCT filing PCT/CN2016/071950, filed Jan. 25, 2016, and claims priority to CN 201510049965.4, filed Jan. 30, 2015, the entire contents of each are incorporated herein by reference.

FIELD

The disclosure relates to the field of wireless communication technology, and in particular to an apparatus and a method for handover control in a dynamic network.

BACKGROUND

With the rapid development of computer and communication technologies, the numbers of user equipment, service requirements and use scenarios will increase exponentially, which further intensifies the contradiction between wireless service requirements and wireless spectrum resources. The dynamic network seeks to constantly adjust the network topology (including functions of network nodes and transmission paths for data) during network operation, thereby further enhancing multiplexing efficiency of wireless resources, in order to meet user requirements while ensuring effective utilization of resources.

However, diversity and changeability of access environment of the dynamic network increase complexity of maintaining reliability of user access links. When an access node has characteristics of mobility and limited access capacity, if status of the access node varies dramatically, a traditional mechanism in which handover measurement is triggered when a reception signal quality of user equipment degrades to a certain degree may cause a significant delay or even result in user data loss.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above issue, it is an object of the present disclosure to provide an apparatus and a method for dynamic network control, which can estimate a positional status of user equipment (for example, by estimating relationship between a movement range and an effective signal coverage of an access point) and a network coverage status by analyzing a motion state of mobile user equipment, and/or channel condition measurement values and/or feedback values, thereby determining whether to initiate handover measurement for the user equipment and selecting a suitable link to be accessed and configuration for the user equipment, in order to ensure communication qualities such as service continuity and Quality of Service (QoS) for the user equipment. Specifically, start time of effective link handover can be shortened, unnecessary link handovers can be reduced, and delay and data loss due to link failure can be reduced.

According to an aspect of the present disclosure, it is provided an apparatus on a master device side in a wireless communication system, the master device being configured to provide data forwarding service to one or more slave devices in the wireless communication system, the apparatus comprising: a monitoring unit configured to monitor a predetermined trigger event regarding variation in status of the master device; a handover pre-measurement control unit configured to control handover pre-measurement for the one or more slave devices in response to the predetermined trigger event; and a handover measurement control unit configured to control handover measurement for the one or more slave devices according to a result of the handover pre-measurement.

According to a preferred embodiment of the present disclosure, the above apparatus may further include: a target slave device determination unit configured to determine, according to the variation in status of the master device, a target slave device to be influenced by the variation in status among the one or more slave devices. Preferably, the handover pre-measurement control unit may be further configured to control the handover pre-measurement for the target slave device in response to the predetermined trigger event, and the handover measurement control unit may be further configured to control the handover measurement for the target slave device according to the result of the handover pre-measurement.

According to another preferred embodiment of the present disclosure, the predetermined trigger event may include at least one of power adjustment, resource configuration adjustment and mobility variation of the master device.

According to another preferred embodiment of the present disclosure, the handover pre-measurement control unit may further include: a handover pre-measurement request transmission module configured to transmit a handover pre-measurement request to the target slave device; a handover pre-measurement data acquisition module configured to acquire handover pre-measurement data based on a response of the target slave device to the handover pre-measurement request, the handover pre-measurement data being acquired by performing statistical analysis on relationship between a movement range of the target slave device and an effective signal coverage of the master device; and a determination module configured to determine whether the target slave device is to perform handover from the master device to another device, and/or a candidate handover target set for the target slave device, according to the acquired handover pre-measurement data. Preferably, the handover measurement control unit may be further configured to control the handover measurement for the target slave device according to a determination result from the determination module.

According to another preferred embodiment of the present disclosure, the candidate handover target set may include at least one of a base station, a device discoverable by the master device, and a device determined by the master device according to radio resource management measurement for the base station.

According to another preferred embodiment of the present disclosure, the handover pre-measurement request may include at least one of measurement content, a measurement duration and a measurement frequency.

According to another preferred embodiment of the present disclosure, the measurement content comprises at least one of positional status information of the master device and the target slave device and link quality information of a link between the master device and the target slave device, the positional status information and the link quality information being required to be measured and reported by the target slave device.

According to another preferred embodiment of the present disclosure, the handover pre-measurement data acquisition module may be further configured to receive from the target slave device and perform statistical analysis on positional relationship between the master device and the target slave device and/or a channel condition measurement value regarding a channel between the master device and the target slave device, so as to acquire the handover pre-measurement data.

According to another preferred embodiment of the present disclosure, the channel condition measurement value may include at least one of a reference signal reception power (RSRP), a reference signal reception quality (RSRQ), a signal to interference-and-noise ratio (SINR) and a channel quality indicator (CQI).

According to another preferred embodiment of the present disclosure, the handover pre-measurement control unit may be further configured to acquire handover pre-measurement data by performing statistical analysis on a channel condition feedback parameter regarding a channel between the master device and the target slave device, and the handover measurement control unit may be further configured to control the handover measurement for the target slave device according to the handover pre-measurement data.

According to another preferred embodiment of the present disclosure, the channel condition feedback parameter may include retransmission times of a hybrid automatic repeat request (HARQ).

According to another preferred embodiment of the present disclosure, if the handover pre-measurement data indicates that the movement range of the target slave device is completely covered by the effective signal coverage of the master device, the determination module determines no handover is to be performed and the master device continues providing uplink and downlink data services to the target slave device; if the handover pre-measurement data indicates that the movement range of the target slave device is partially overlapped with the effective signal coverage of the master device, the determination module determines that the target slave device is to perform handover to a device the effective signal coverage of which completely covers the movement range of the target slave device to acquire a downlink data service; and if the handover pre-measurement data indicates that the movement range of the target slave device is completely out of the effective signal coverage of the master device, the determination module determines that the target slave device is to perform handover to a device the effective signal coverage of which completely covers the movement range of the target slave device to acquire uplink and downlink data services.

According to another preferred embodiment of the present disclosure, the handover measurement control unit may further include: a handover measurement request transmission module configured to transmit a handover measurement request to the target slave device according to the determination result from the determination module; a handover measurement result reception module configured to receive a handover measurement result returned by the target slave device in response to the handover measurement request; a decision module configured to decide a handover target device for the target slave device according to the handover measurement result; a handover request transmission module configured to transmit a handover request to the handover target device; and a handover result processing module configured to notify the target slave device of handover configuration information and perform handover result processing, according to a handover request response from the handover target device.

According to another preferred embodiment of the present disclosure, the handover measurement control unit may further include: a handover measurement request transmission module configured to transmit a handover measurement request to the target slave device according to the determination result from the determination module; a handover result reception module configured to receive, from the target slave device, a handover result regarding an establishment condition of a connection between the target slave device and a handover target device, where the handover target device is determined by the target slave device in response to the handover measurement request; a handover result processing module configured to perform handover result processing according to the received handover result; and a handover result response transmission module configured to transmit a result of the handover result processing to the target slave device as a response to the handover result.

According to another preferred embodiment of the present disclosure, the handover measurement request may include at least one of measurement content and the candidate handover target set, and the handover target device may be determined among the candidate handover target set.

According to another preferred embodiment of the present disclosure, the handover result processing may include at least one of service link updating and data integrity processing for the target slave device.

According to another preferred embodiment of the present disclosure, communication between the master device and the one or more slave devices is device to device communication.

According to another aspect of the present disclosure, it is further provided an apparatus on a slave device side in a wireless communication system, a master device being configured to provide data forwarding service to the slave device in the wireless communication system, the apparatus including: a handover pre-measurement request reception unit configured to receive a handover pre-measurement request transmitted by the master device in response to a predetermined trigger event regarding variation in status of the master device; a handover measurement request reception unit configured to receive a handover measurement request transmitted by the master device according to handover pre-measurement data, the handover pre-measurement data being acquired by performing statistical analysis on relationship between a movement range of the slave device and an effective signal coverage of the master device based on a response of the slave device to the handover pre-measurement request; and a handover measurement control unit configured to control handover measurement according to the handover measurement request.

According to another aspect of the present disclosure, it is further provided a method applied on a master device side in a wireless communication system, the master device being configured to provide data forwarding service to one or more slave devices in the wireless communication system, the method including: a monitoring step of monitoring a predetermined trigger event regarding variation in status of the master device; a handover pre-measurement control step of controlling handover pre-measurement for the one or more slave devices in response to the predetermined trigger event; and a handover measurement control step of controlling handover measurement for the one or more slave devices according to a result of the handover pre-measurement.

According to another aspect of the present disclosure, it is further provided a method applied on a slave device side in a wireless communication system, a master device being configured to provide data forwarding service to the slave device in the wireless communication system, the method including: a handover pre-measurement request reception step of receiving a handover pre-measurement request transmitted by the master device in response to a predetermined trigger event regarding variation in status of the master device; a handover measurement request reception step of receiving a handover measurement request transmitted by the master device according to handover pre-measurement data, the handover pre-measurement data being acquired by performing statistical analysis on relationship between a movement range of the slave device and an effective signal coverage of the master device based on a response of the slave device to the handover pre-measurement request; and a handover measurement control step of controlling handover measurement according to the handover measurement request.

According to another aspect of the present disclosure, it is further provided an apparatus in a wireless communication system, the apparatus including: a handover request reception unit configured to receive a handover request from a request source, where the request source is a master device or a slave device, and in the wireless communication system, the master device provides data forwarding service to the slave device; an admission control performing unit configured to perform admission control according to the handover request, to determine whether the slave device is able to perform handover to a device where the apparatus is located; a handover request response transmission unit configured to transmit a response to the handover request to the request source according to a result of the admission control; a connection establishment unit configured to establish a connection with the slave device according to the result of the admission control; and a handover result processing unit configured to perform handover result processing according to a handover result regarding establishment condition of the connection.

According to another aspect of the present disclosure, it is further provided an electronic device, the electronic device including one or more processors configured to implement the above methods or the functions of corresponding units according to the present disclosure.

According to other aspects of the present disclosure, there are further provided computer program codes and a computer program product for implementing the above methods according to the present disclosure, and a computer readable storage medium on which the computer program codes for implementing the above methods according to the present disclosure are recorded.

Currently, Proximity Service (ProSe) for example D2D communication is being discussed and explored in the industry, with no agreement being reached in its design solution. As compared with the conventional technology in which the handover measurement is triggered only when reception signal quality of cellular user equipment degrades to a certain degree, in the embodiments of the present disclosure, with respect to characteristics of the ProSe, when a status of the master device is changed, the handover pre-measurement is initiated to perform statistical analysis on the relationship between the effective signal coverage of the master device and the movement range of the slave device, thereby determining whether to initiate the handover measurement for the slave device and selecting a suitable link to be accessed and configuration for the slave device, in order to ensure communication qualities such as service continuity and QoS for the user equipment. For example, start time of effective link handover can be shortened, and the reliability of data transmission in the dynamic network can be improved while reducing delay due to link quality degradation, thus robustness of the dynamic network can be enhanced.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE EMBODIMENTS

Figure 1:
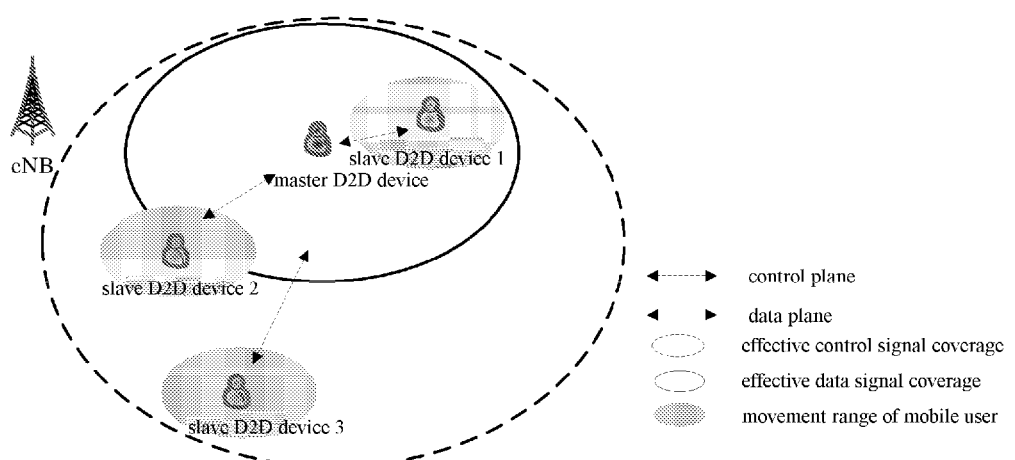
FIG. 1 is a schematic diagram illustrating a structure of a dynamic network according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

In the following, preferred embodiments of the present disclosure will be described in detail in conjunction with FIGS. 1 to 21.

Here, it is to be noted that, a dynamic network has various topologies, and the present disclosure is described by taking only a device to device (D2D) communication scenario in 3GPP as an example. However, the present disclosure is not limited thereto, but can be similarly applied to handover control in other types of dynamic networks, such as scenarios of dual-link, Femtocell and the like, in which a small cell base station is operable as the master device in the present disclosure for example.

FIG. 1 is a schematic diagram illustrating a structure of a dynamic network according to an embodiment of the present disclosure. As shown in FIG. 1, in a D2D network, two parties communicating with each other are respectively referred to as a master D2D device and a slave D2D device, where the master D2D device may forward data between a base station (for example, an evolved node B, eNB) and the slave D2D device, or between the slave D2D device and another D2D device, for establishing communication in a public safety emergency event for example. In addition, in some examples, roles of the master D2D device and the slave D2D device can be exchanged (the D2D device is capable of operating as the master D2D device as well as the slave D2D device). It should be understood that, the access capacity of the D2D device is limited due to the influence of software and hardware configurations such as a power supply configuration, an antenna configuration, computing capability and the like, and an effective signal coverage on a control plane for transmitting control signals and an effective signal coverage on a data plane for transmitting data signals may be identical or different, for example, the control plane and the data plane have different effective signal coverage since different modulation coding schemes/transmission powers are used for information on the control plane and the data plane.

Further, it should be understood that, the above master D2D device may include user equipment such as a mobile phone, a tablet computer, a laptop computer, a personal digital assistant, a navigation device, an intelligent vehicle and the like, which will not be limited in the disclosure.

Figure 2:
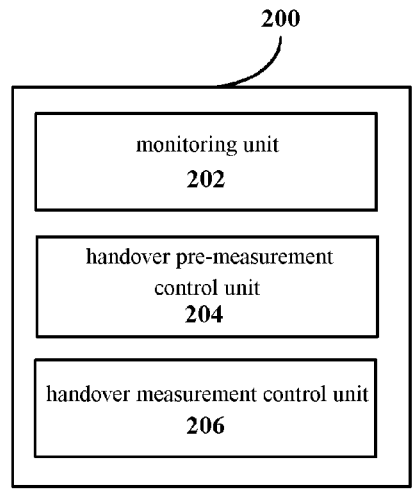
FIG. 2 is a block diagram illustrating a functional configuration example of an apparatus on a master device side in a wireless communication system according to an embodiment of the present disclosure.

FIG. 2 is a block diagram illustrating a functional configuration example of an apparatus on a master device side in a wireless communication system according to an embodiment of the present disclosure.

In the wireless communication system, the master device functions to provide data forwarding service to one or more slave devices. Preferably, communication between the master device and the one or more slave devices is D2D communication. It should be understood that, the master device here may include user equipment, an access point in a WiFi network, a mobile base station (for example, a small base station, a femtocell base station and the like), and the like.

As shown in FIG. 2, an apparatus 200 on the master device side may include a monitoring unit 202, a handover pre-measurement control unit 204, and a handover measurement control unit 206. In the following, functional configuration examples of respective units are described in detail.

The monitoring unit 202 may be configured to monitor a predetermined trigger event regarding variation in status of the master device. Preferably, the predetermined trigger event may include at least one of power adjustment, resource configuration adjustment and mobility variation of the master device.

It is to be noted that, in the conventional technology, handover management for, for example, user equipment, is generally made by a base station (for example, eNB) based on a link status for the user equipment which is to perform handover. However, according to the present disclosure, it is inventively proposed the handover management is triggered according to variation in status, especially variation in resource configuration and mobility, of the device serving the user equipment which is to perform handover (i.e., the master device described herein), thereby ensuring communication qualities such as service continuity and QoS for the user equipment.

The handover pre-measurement control unit 204 may be configured to control handover pre-measurement for the one or more slave devices in response to the predetermined trigger event. In a case that the power of the master device is adjusted, radio resource configuration is changed, for example, available resource pool between the master device and the slave device is changed, carrier aggregation is cancelled, dual-link is cancelled and the like, or the mobility is changed, for example, the master device begins to move/performs handover and the like, one or more slave devices which acquire data forwarding services from the master device may be influenced. Thus, handover pre-measurement for these slave devices may be triggered for estimating relationship between the effective signal coverage of the master device and movement ranges of these slave devices, in order to determine whether it is necessary to initiate subsequent handover measurement for these slave devices.

The handover measurement control unit 206 may be configured to control handover measurement for the one or more slave devices according to a result of the handover pre-measurement. According to the result of the handover pre-measurement acquired by the handover pre-measurement control unit 204, the handover measurement control unit 206 may initiate handover measurement for corresponding slave device(s), such that the influenced slave device(s) may perform handover to another suitable master device or eNB to acquire better service quality.

It should be understood that, when initiating the handover pre-measurement for the corresponding slave device, the handover pre-measurement control unit 204 may transmit handover pre-measurement requests to all of the slave devices served by the master device. However, since some of the slave devices may be not influenced by the variation in status of the master device, such manner may cause signaling waste, increase transmission loads and processing loads, thereby reducing network efficiency. Therefore, the handover pre-measurement control unit 204 may preferably transmit the handover pre-measurement requests to only one or more slave devices which may be influenced by the variation in status of the master device. In the following, another functional configuration example of the apparatus on the master device side in the wireless communication system according to an embodiment of the present disclosure in this case is described with reference to FIG. 3, which is a block diagram illustrating another functional configuration example of an apparatus on a master device side in a wireless communication system according to an embodiment of the present disclosure.

Figure 3:
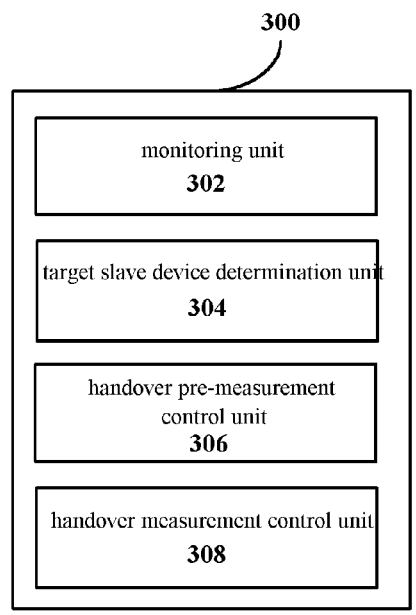
FIG. 3 is a block diagram illustrating another functional configuration example of an apparatus on a master device side in a wireless communication system according to an embodiment of the present disclosure.

As shown in FIG. 3, the apparatus 300 may include a monitoring unit 302, a target slave device determination unit 304, a handover pre-measurement control unit 306, and a handover measurement control unit 308, where functional configuration examples of the monitoring unit 302, the handover pre-measurement control unit 306, and the handover measurement control unit 308 are essentially the same as functional configuration examples of the monitoring unit 202, the handover pre-measurement control unit 204, and the handover measurement control unit 206 described above with reference to FIG. 2, and details thereof are not repeatedly described here. In the following, only a functional configuration example of the target slave device determination unit 304 is described in detail.

The target slave device determination unit 304 may be configured to determine, according to the variation in status of the master device, a target slave device to be influenced by the variation in status among the one or more slave devices. Preferably, as an example, the target slave device determination unit 304 may determine the target slave device which may be influenced according to information stored when connections with the one or more slave devices are initially established (for example, information such as locations, maximum transmission powers and the like of the one or more slave devices) and based on a status adjustment target and status information after the status is changed of the master device (for example, the position, the transmission power, the available resource pool and the like of the master device). For example, in a case that the master device needs to reduce the power used to serve the slave devices, the target slave device determination unit 304 may estimate current effective signal coverage of the master device, and select a slave device out of the current effective signal coverage as the target slave device to initiate the handover pre-measurement.

As another example, variation in the available resource pool may include variation in the number of available resource pools (for example, the number of available frequency bands or the number of available resource blocks) and variation in specifically allocated resources (for example, variation in frequency band resources specifically allocated to the slave devices). In a case that the number of available resource pools of the master device is changed, for example, if the number of available resource pools is increased, the effective signal coverage of the master device may be increased, and a slave device which is not originally served by the master device may be selected from slave devices located within the increased effective signal coverage as the target slave device to initiate the handover pre-measurement, thereby determining whether the slave device may be served by the master device. That is, in this case, the number of slave devices which can be served by the master device may be increased, and the increased number of the slave devices should at least satisfy a capacity limitation on a maximum number of slave devices that can be served by the master device as well as a limitation on link services for the slave devices that can be supported by the increased resource pools. On the contrary, in a case that the number of available resource pools of the master device is decreased, similar to the above case that the transmission power of the master device is reduced, a slave device out of the decreased effective signal coverage may be selected as the target slave device to initiate the handover pre-measurement. On the other hand, in a case that the specifically allocated frequency band resources are changed, the target slave device may be selected according to the current effective signal coverage of the master device and usage efficiencies for different frequency band resources of the slave devices (which may be determined according to, for example, a channel condition or the like) to initiate the handover pre-measurement, thus a frequency band with a higher resource efficiency may be selected for the target slave device.

Preferably, the handover pre-measurement control unit 306 may be further configured to control the handover pre-measurement for the determined target slave device in response to the predetermined trigger event, and the handover measurement control unit 308 may be further configured to control the handover measurement for the target slave device according to the result of the handover pre-measurement. Further, preferably, the master device may update the above stored information regarding the slave devices with the measured information for future processing.

It should be understood that, although a manner for determining the target slave device is described herein, it is exemplary only but not limitation, and those skilled in the art may also determine the target slave device that may be influenced according to a predetermined adjustment target of the master device in other manners.

Next, a functional configuration example of the handover pre-measurement control unit in the apparatus on the master device side according to an embodiment of the present disclosure is described with reference to FIG. 4, which is a block diagram illustrating a functional configuration example of a handover pre-measurement control unit in the apparatus on the master device side according to an embodiment of the present disclosure.

Figure 4:
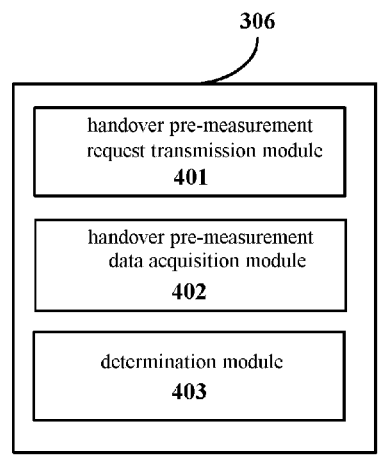
FIG. 4 is a block diagram illustrating a functional configuration example of a handover pre-measurement control unit in the apparatus on the master device side according to an embodiment of the present disclosure.

As shown in FIG. 4, the handover pre-measurement control unit 306 may include a handover pre-measurement request transmission module 401, a handover pre-measurement data acquisition module 402, and a determination module 403. In the following, functional configuration examples of respective modules are described in detail.

The handover pre-measurement request transmission module 401 may be configured to transmit a handover pre-measurement request to the determined target slave device.

Preferably, the handover pre-measurement request may include at least one of measurement content, a measurement duration and a measurement frequency. The measurement content herein may include at least one of positional status information of the master device and the target slave device and link quality information of a link between the master device and the target slave device, the positional status information and the link quality information being required to be measured and reported by the target slave device.

The handover pre-measurement data acquisition module 402 may be configured to acquire handover pre-measurement data based on a response of the target slave device to the handover pre-measurement request, the handover pre-measurement data being acquired by performing statistical analysis on relationship between a movement range of the target slave device and an effective signal coverage of the master device Preferably, as an example, the handover pre-measurement data acquisition module 402 may be configured to receive from the target slave device and perform statistical analysis on positional relationship between the master device and the target slave device and/or a channel condition measurement value regarding a channel between the master device and the target slave device, so as to acquire the handover pre-measurement data. Preferably, the channel condition measurement value may include at least one of a reference signal reception power (RSRP), a reference signal reception quality (RSRQ), a signal to interference-and-noise ratio (SINR) and a channel quality indicator (CQI).

Further, as another preferred example, the handover pre-measurement control unit 306 may be further configured to acquire handover pre-measurement data by performing statistical analysis on a channel condition feedback parameter regarding a channel between the master device and the target slave device, and the handover measurement control unit 308 may be further configured to control the handover measurement for the target slave device according to the handover pre-measurement data. Preferably, the channel condition feedback parameter may include retransmission times of a hybrid automatic repeat request (HARQ).

It is to be noted that, in a case that the handover pre-measurement data is acquired according to the channel condition feedback parameter, since the master device can record the retransmission times of the HARQ by itself, the handover pre-measurement data may be acquired without participation of the target slave device. That is, in this case, it is neither necessary to transmit the handover pre-measurement request to the target slave device nor to provide the above handover pre-measurement request transmission module. Instead, the handover pre-measurement control unit 306 on the master device side acquires the handover pre-measurement data according to a statistical result on the retransmission times of the HARQ from the target slave device in a predetermined period, for subsequent determination regarding whether to initiate the handover measurement request for the target slave device.

It should be understood that, although it has been described as an example that the statistical analysis is performed on the master device side in order to acquire the handover pre-measurement data, the above processing (that is, the statistical analysis on the relationship between the movement range of the target slave device and the effective signal coverage of the master device) may be also performed on the target slave device side, in order to acquire the handover pre-measurement data and report it to the master device. In this manner, upon reception of the handover pre-measurement request, the slave device performs the corresponding handover pre-measurement, performs statistical analysis on the measured information, and finally reports the acquired handover pre-measurement data to the master device. In this way, the network overhead can be reduced, but the processing load on the slave device side may be increased. A detailed description regarding this case will be provided in the following description regarding the slave device side.

Next, an example of a specific implementation for performing the statistical analysis on the relationship between the movement range of the target slave device and the effective signal coverage of the master device in order to acquire the handover pre-measurement data is described in detail. As shown in FIG. 1, the relationship between the movement range of the target slave device and the effective signal coverage of the master device include three situations: a situation 1 corresponds to a case where the movement range of the target slave device is completely covered by the effective data signal coverage of the master device, such as a slave D2D device 1; a situation 2 corresponds to a case where the movement range of the target slave device is partially overlapped with the effective data signal coverage of the master device, such as a slave D2D device 2; and a situation 3 corresponds to a case where the movement range of the target slave device is completely out of the effective data signal coverage of the master device, such as a slave D2D device 3. In the following, as an example, three methods for distinguishing these three situations are described. It should be understood that, these three situations reflect the distance between the target slave device and the master device, and at least qualitatively describe how close or how far is the target slave device from the master device. In some examples of the present disclosure, target slave devices may be divided into different classes according to these three situations.

A first method: the analysis may be performed based on motion states of the master device and the target slave device. That is, the above three situations are distinguished directly using a statistical distribution of a distance value between the master device and the target slave device.

Specifically, positions of the target slave device and the master device serving the target slave device are sampled at a predetermined time interval t. For example, the handover pre-measurement request from the master device to the target slave device may include a request for position information, the target slave device drives, in response to the request, its GPS module/LBS (location based service) module to perform positioning in order to acquire position samples, and report the position samples to the master device for example. Accordingly, the master device drives, for example, its GPS/LBS module to perform positioning to acquire position samples of the master device. In particular, i-th sampled position results of the target slave device and the master device are respectively denoted as $x_i$ and $y_i$, then a distance $d_i=|x_i-y_i|$ between the position of the target slave device and the position of the master device for each sampling is calculated. Given that a radius of the effective signal coverage of the master device is $r_i$, a new random variable $X=|d_i-r_i|$ is acquired, and a cumulative distribution function (CDF) of the random variable X is acquired according to sampling results in a predetermined time period T. When the abscissa value is 0, if a corresponding CDF value is greater than or equal to a predetermined inclusion threshold $\delta c$ (for example, $\delta c$ may be set to 0.95, or to 1 more strictly), it is determined that the current case corresponds to the above situation 1, where the predetermined inclusion threshold $\delta c$ indicates a critical value where the effective signal coverage of the master device exactly covers the movement range of the target slave device. When the abscissa value is 0, if a corresponding CDF value is smaller than or equal to a predetermined separation threshold $\delta s$ (for example, $\delta s$ may be set to 0.05, or to 0 more strictly), it is determined that the current case corresponds to the above situation 3, where the predetermined separation threshold $\delta s$ indicates a critical value where the effective signal coverage of the master device is exactly completely separated from the movement range of the target slave device. Other cases (that is, when the abscissa value is 0, a corresponding CDF value is between the predetermined separation threshold $\delta s$ and the predetermined inclusion threshold $\delta c$) correspond to the above situation 2.

Preferably, if the target slave device may stay at a certain position for a long time, its position $x_i$ is a constant value; if the master device is a fixed node, its position $y_i$ is a constant value; and if a power of the master device is a fixed value, the radius $r_i$ of the effective signal coverage thereof is a constant value. In a case that one or more of the above parameters are constant values, a measurement frequency of the handover pre-measurement may be reduced, thereby reducing processing loads.

A second method: the statistical analysis may be performed based on the channel condition measurement value. That is, the above three situations are distinguished using a statistical distribution of a difference between the channel condition measurement value regarding the channel between the target slave device and the master device and a channel condition threshold satisfying effective transmission. Specifically, the target slave device may for example measure the channel condition regarding the channel between the target slave device and the master device at a predetermined time interval t based on the handover pre-measurement request from the master device. Preferably, the channel condition measurement value may include at least one of RSRP, RSRQ, SINR and CQI. Then, for the i-th sampling, a new random variable $Y=|q_i-e_i|$ is acquired, which is a difference between the channel condition threshold $q_i$ satisfying effective transmission and the channel condition measurement value $e_i$. Similarly, CDF of the random variable Y is acquired according to sampling results in a predetermined time period T. Similarly, the predetermined separation threshold $\delta s$ and the predetermined inclusion threshold $\delta c$ are set, and the above three situations are distinguished in a manner similar to the manner in the first method. Similarly, a sampling frequency and/or a feedback frequency may be adjusted according to a frequency of variation in the measurement parameter.

A third method: the statistical analysis may be performed based on the channel condition feedback parameter. That is, the above three situations are distinguished using a statistical distribution of a difference between the channel condition feedback parameter and a threshold satisfying effective transmission. Preferably, the channel condition feedback parameter may include HARQ retransmission times. Then, for the i-th sampling, a new random variable $Z=|q_i-f_i|$ is acquired, which is a difference between the threshold $q_i$ satisfying effective transmission and the channel condition feedback parameter $f_i$, and CDF of the random variable Z is acquired according to sampling results in a predetermined time period T. Similarly, the predetermined separation threshold $\delta s$ and the predetermined inclusion threshold $\delta c$ are set, and the above three situations are distinguished in a manner similar to the manner in the first method. Similarly, a sampling frequency and/or a feedback frequency may be adjusted according to a frequency of variation in the measurement parameter.

It should be understood that, although three methods for determining the relationship between the movement range of the target slave device and the effective signal coverage of the master device have been described above by way of example, these methods are exemplary only but not limitation, and those skilled in the art may conceive of other methods for determining the relationship. For example, the statistical analysis on the above random variables is not limited to CDF, but can be performed using, for example, an expected value, a median value, an average value and the like of the random variable X for example.

In addition, it should also be understood that, the above statistical analysis may be performed on the master device side or the slave device side, as long as a corresponding counterpart device provides necessary information to the party performing the statistical analysis by means of signaling interaction. In a case that the above handover pre-measurement calculation is performed on the slave device side, the slave device may report the finally acquired handover pre-measurement data to the master device. For example, the slave device reports a class ID of the slave device to the master device according to the situation to which the slave device belongs.

Referring back to FIG. 4, the determination module 403 may be configured to determine whether the target slave device is to perform handover from the master device to another device, and/or a candidate handover target set for the target slave device, according to the acquired handover pre-measurement data.

Specifically, if the handover pre-measurement data acquired by the handover pre-measurement data acquisition module 402 indicates that the movement range of the target slave device is completely covered by the effective signal coverage of the master device (corresponding to the above situation 1), the determination module 403 may determine no handover is to be performed, and the master device continues providing uplink and downlink data services to the target slave device, such as the slave D2D device 1 in FIG. 1. If the handover pre-measurement data indicates that the movement range of the target slave device is partially overlapped with the effective signal coverage of the master device (corresponding to the above situation 2), the determination module 403 determines that the target slave device may perform handover to a device the effective signal coverage of which can completely cover the movement range of the target slave device to acquire a downlink data service, such as the slave D2D device 2 in FIG. 1. If the handover pre-measurement data indicates that the movement range of the target slave device is completely out of the effective signal coverage of the master device (corresponding to the above situation 3), the determination module 403 determines that the target slave device may perform handover to a device the effective signal coverage of which can completely cover the movement range of the target slave device to acquire uplink and downlink data services, such as the slave D2D device 3 in FIG. 1. It is to be noted that, preferably, the effective signal coverage of the master device indicates effective signal coverage of the master device on the data plane.

In particular, for the situation 2, considering that the movement range of the target slave device is partially overlapped with the effective signal coverage of the master device, once the target slave device is out of the coverage, downlink data from the master device cannot be transmitted to the target slave device in time, thereby causing a significant delay or even data loss. Therefore, a handover target device the data signal coverage of which can cover the movement range of the target slave device may be selected for the target slave device, in order to provide the downlink data service to the target slave device, while the uplink data service may be still provided by the original master device, and a transmission power of the target slave device may be adjusted in order to ensure that the uplink data service can be used normally. In this situation, an area and a time proportion of the overlapping between the movement range of the target slave device and the effective data signal coverage of the master device may be further considered in order to further subdivide the selection result of the data plane service and the control plane service.

An example of a possible selection result of the data plane service and the control plane service for the above three situations is described with reference to FIG. 5, which is a schematic diagram illustrating a handover result in the dynamic network according to an embodiment of the present disclosure.

Figure 5:
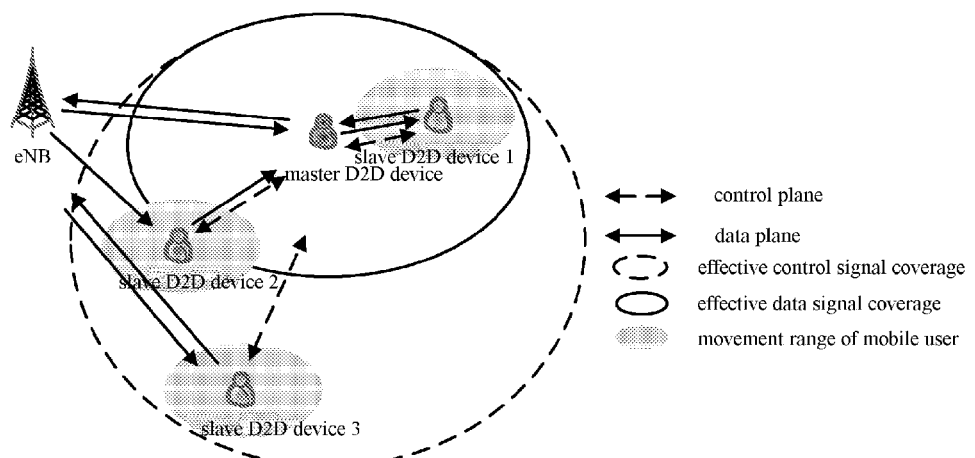
FIG. 5 is a schematic diagram illustrating an example of a handover result in the dynamic network according to an embodiment of the present disclosure.

As shown in FIG. 5, for the slave D2D device 1 the movement range of which is completely covered by the effective signal coverage of the master device, both the control plane service and the data plane service thereof are provided by the master D2D device; for the slave D2D device 2 the movement range of which is partially overlapped with the effective signal coverage of the master device, at least the downlink data service thereof is provided by, for example, the eNB, while the control plane service and the uplink data service are provided by, for example, the master D2D device; and for the slave D2D device 3 the movement range of which is completely out of the effective signal coverage of the master device, at least both of the uplink and downlink data services thereof are provided by, for example, the eNB, while the control plane service may be provided by, for example, the master D2D device.

It should be understood that, the above selection result of the data plane service and the control plane service is exemplary only but not limitation. For example, for the slave D2D device 3, if a strength of a control signal received by the slave D2D device 3 from the master D2D device is lower than a strength of a control signal provided by the eNB, the slave D2D device 3 may select only the eNB to provide the control plane service and the data plane service for the slave D2D device 3.

Preferably, the candidate handover target set determined by the determination module 403 may include a base station, a device discoverable by the master device, and a device determined by the master device according to radio resource management (RRM) measurement for the base station. For example, the device being discoverable by the master device indicates that a distance between the device and the master device is relatively small. In a case that a variation in status (for example, a variation in position) of the master device is not significant, the device discoverable by the master device may be preferentially considered to be determined as the candidate handover target for the target slave device. In addition, for example, the candidate handover target set may be determined according to a RRM measurement result for the base station by another device (for example, another slave device served by the master device) in the network, if the RRM measurement result indicates that a channel between another device and the base station has a good channel quality, the master device may preferentially determine this device as the candidate handover target for the target slave device.

Thus, the handover measurement control unit 308 may further control the handover measurement for the target slave device according to a determination result from the determination module 403 (including determination regarding whether to perform handover and/or the candidate handover target set).

As can be seen, according to the embodiments of the disclosure, as compared with the conventional technology, by performing the handover pre-measurement to determine whether the slave device is to be influenced by the variation in status of the master device prior to initiating the handover measurement, a ping-pong effect caused by frequent handover when the slave device is located on a boundary of the effective signal coverage of the master device can be also avoided.

Next, a functional configuration example of the handover measurement control unit in the apparatus on the master device side according to an embodiment of the present disclosure is described with reference to FIG. 6, which is a block diagram illustrating a functional configuration example of a handover measurement control unit in the apparatus on the master device side according to an embodiment of the present disclosure.

Figure 6:
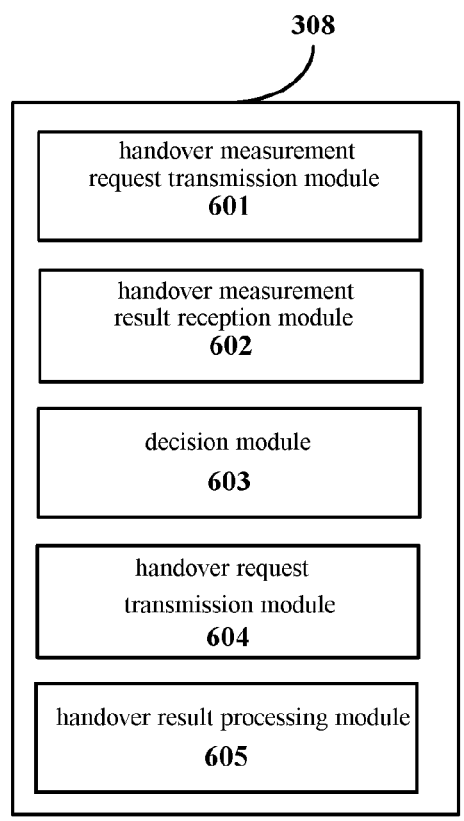
FIG. 6 is a block diagram illustrating a functional configuration example of a handover measurement control unit in the apparatus on the master device side according to an embodiment of the present disclosure.

As shown in FIG. 6, the handover measurement control unit 308 may include a handover measurement request transmission module 601, a handover measurement result reception module 602, a decision module 603, a handover request transmission module 604 and a handover result processing module 605. In the following, functional configuration examples of respective modules are described in detail.

The handover measurement request transmission module 601 may be configured to transmit a handover measurement request to the target slave device according to the determination result from the determination module 403. Specifically, in a case that the determination module 403 of the handover pre-measurement control unit 306 determines that the target slave device is to be influenced by the variation in status of the master device, the handover measurement request transmission module 601 may transmit the handover measurement request to the target slave device. The handover measurement request may preferably include measurement configuration information, for example, at least one of measurement content and the candidate handover target set.

The handover measurement result reception module 602 may be configured to receive a handover measurement result returned by the target slave device in response to the handover measurement request. Specifically, the target slave device may perform handover measurement according to the measurement content and/or the candidate handover target set included in the handover measurement request (that is, according to the measurement configuration information), in order to acquire a measurement result for each of the candidate handover targets in the candidate handover target set and report it to the master device.

The decision module 603 may be configured to decide a handover target device for the target slave device according to the received handover measurement result. Preferably, the decision module 603 may be configured to decide the handover target device among the candidate handover target set according to the handover measurement result.

The handover request transmission module 604 may be configured to transmit a handover request to the determined handover target device.

The handover result processing module 605 may be configured to notify the target slave device of handover configuration information and perform handover result processing, according to a handover request response from the handover target device.

Specifically, the handover target device performs admission control according to related information in the received handover request and its own configuration, and returns the handover request response, including information regarding whether the target slave device is allowed to access to the handover target device, to the master device. The handover result processing module 605 notifies the target slave device of the handover configuration information and performs the handover result processing according to the handover request response. Preferably, the handover result processing herein may include at least one of service link updating and data integrity processing for the target slave device.

In the above embodiment, upon reception of the handover configuration information, the slave device may update the service link following an existing handover flow in the LTE cellular network, in which the target slave device firstly establishes a new connection with the handover target device, then the handover target device and the original master device perform processing for ensuring the data integrity of the target slave device, and finally the target slave device disconnects the connection with the original master device.

It should be understood that, in a case that the control plane service is not maintained between the target slave device and the handover target device, as described in the above embodiment, the handover request may be transmitted to the handover target device by the handover request transmission module 604 in the apparatus on the master device side. However, in a case that the control plane service is maintained between the target slave device and the handover target device, the target slave device may also directly transmit the handover request to the handover target device, thus it is not necessary to provide the above handover request transmission module 604 on the master device side. In the following, a functional configuration example of the handover measurement control unit in this case is described with reference to FIG. 7, which is a block diagram illustrating another functional configuration example of a handover measurement control unit in the apparatus on the master device side according to an embodiment of the present disclosure.

Figure 7:
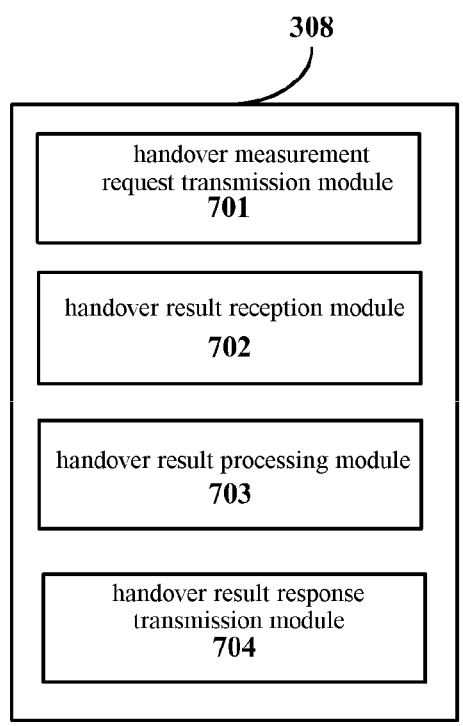
FIG. 7 is a block diagram illustrating another functional configuration example of a handover measurement control unit in the apparatus on the master device side according to an embodiment of the present disclosure.

As shown in FIG. 7, the handover measurement control unit 308 may include a handover measurement request transmission module 701, a handover result reception module 702, a handover result processing module 703, and a handover result response transmission module 704. In the following, functional configuration examples of respective modules are descried in detail.

The handover measurement request transmission module 701 may be configured to transmit a handover measurement request to the target slave device according to the determination result from the determination module 403.

The handover result reception module 702 may be configured to receive, from the target slave device, a handover result regarding an establishment condition of a connection between the target slave device and a handover target device. As an example, the handover target device may be determined among the candidate handover target set by the target slave device in response to the handover measurement request for example.

Since the control plane service is maintained between the target slave device and the candidate handover target device (for example, the eNB) in this case, the target slave device may select a handover target device upon reception of the handover measurement request and transmit the handover request to the selected handover target device. Then the target slave device performs handover processing (i.e., establishment of the connection with the handover target device) according to the response of the handover target device to the handover request, and reports the handover result to the master device.

The handover result processing module 703 may be configured to perform handover result processing according to the received handover result. In this case, the handover result processing may include, for example, processing performed by the master device and the handover target device for ensuring the data integrity of the target slave device, and disconnecting the connection with the target slave device by the master device.

The handover result response transmission module 704 may be configured to transmit a result of the handover result processing to the target slave device as a response to the handover result.

It should be understood that, although the target slave device selects the handover target device according to the handover measurement request in this example, alternatively, the target slave device may transmit the handover measurement result to the master device, and then the master device selects the handover target device and notifies the selection result to the target slave device, which may increase the signaling overhead.

Next, functional configuration examples of an apparatus on a slave device side in a wireless communication system are described with reference to FIGS. 8 to 11.

First, a functional configuration example of an apparatus on a slave device side in a wireless communication system according to an embodiment of the present disclosure is described with reference to FIG. 8, which is a block diagram illustrating a functional configuration example of an apparatus on a slave device side in a wireless communication system according to an embodiment of the present disclosure.

Figure 8:
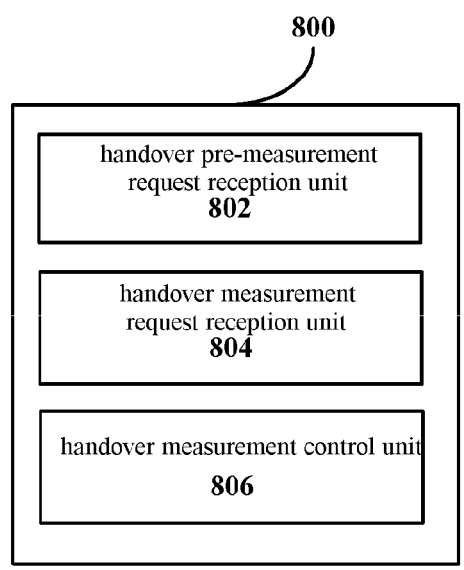
FIG. 8 is a block diagram illustrating a functional configuration example of an apparatus on a slave device side in a wireless communication system according to an embodiment of the present disclosure.

As shown in FIG. 8, an apparatus 800 on the slave device side may include a handover pre-measurement request reception unit 802, a handover measurement request reception unit 804, and a handover measurement control unit 806. In the following, functional configuration examples of respective units are described in detail.

The handover pre-measurement request reception unit 802 may be configured to receive a handover pre-measurement request transmitted by the master device in response to a predetermined trigger event regarding variation in status of the master device.

As described above, the predetermined trigger event may include at least one of power adjustment, resource configuration adjustment and mobility variation of the master device. Preferably, the handover pre-measurement request may include at least one of measurement content, a measurement duration and a measurement frequency, and the measurement content may include at least one of positional status information of the master device and the slave device and link quality information of a link between the master device and the slave device, the positional status information and the link quality information being required to be measured and reported by the slave device.

The handover measurement request reception unit 804 may be configured to receive a handover measurement request transmitted by the master device according to handover pre-measurement data. The handover pre-measurement data is acquired by performing statistical analysis on relationship between a movement range of the slave device and an effective signal coverage of the master device based on a response of the slave device to the handover pre-measurement request. As described above, the handover pre-measurement data may be acquired on the master device side or the slave device side. In addition, in a case that the master device determines the slave device is to be influenced by the variation in status of the master device according to the handover pre-measurement data, the master device transmits the handover measurement request to the slave device to enable the slave device to perform handover to another device (including another user equipment, a base station, or the like) capable of providing services with better quality.

The handover measurement control unit 806 may be configured to control handover measurement according to the received handover measurement request.

Since the example in which the handover pre-measurement calculation is performed on the master device side to acquire the handover pre-measurement data has been described above, a case where the handover pre-measurement data is acquired on the slave device side is mainly described here in detail. However, it should be understood that, in this embodiment, the handover pre-measurement data may also be acquired on the master device side. In the following, a functional configuration example of an apparatus on a slave device side in this case is described with reference to FIG. 9, which is a block diagram illustrating another functional configuration example of an apparatus on a slave device side in the wireless communication system according to an embodiment of the present disclosure.

Figure 9:
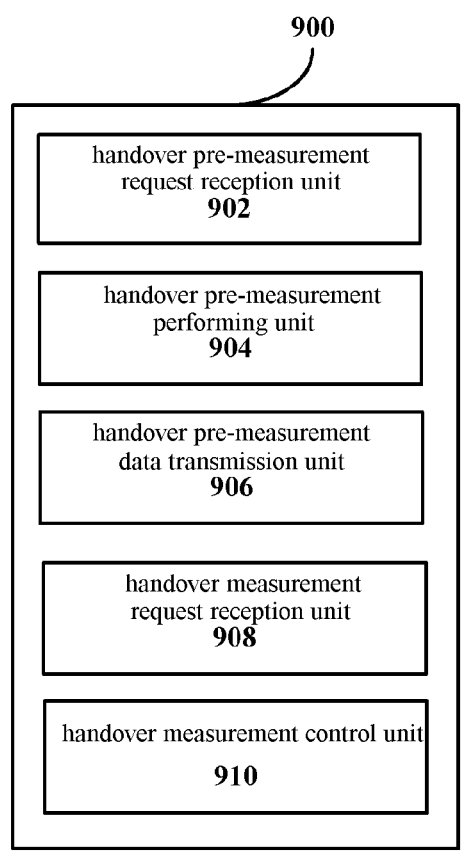
FIG. 9 is a block diagram illustrating another functional configuration example of an apparatus on a slave device side in a wireless communication system according to an embodiment of the present disclosure.

As shown in FIG. 9, an apparatus 900 may include a handover pre-measurement request reception unit 902, a handover pre-measurement performing unit 904, a handover pre-measurement data transmission unit 906, a handover measurement request reception unit 908, and a handover measurement control unit 910, where functional configuration examples of the handover pre-measurement request reception unit 902 and the handover measurement control unit 910 are essentially the same as the functional configuration examples of the handover pre-measurement request reception unit 802 and the handover measurement control unit 806 described above with reference to FIG. 8, and are not repeatedly described in detail herein. In the following, only functional configuration examples of the handover pre-measurement performing unit 904, the handover pre-measurement data transmission unit 906, and the handover measurement request reception unit 908 are described in detail.

The handover pre-measurement performing unit 904 may be configured to perform handover pre-measurement in response to the handover pre-measurement request so as to acquire the handover pre-measurement data.

Preferably, the handover pre-measurement performing unit 904 may be configured to acquire the handover pre-measurement data by performing statistical analysis on positional relationship between the master device and the slave device and/or a channel condition measurement value regarding a channel between the master device and the slave device. The channel condition measurement value may preferably include at least one of RSRP, RSRQ, SINR and CQI. The specific calculation procedure for performing, by the handover pre-measurement performing unit 904, the statistical analysis on the relationship between the movement range of the slave device and the effective signal coverage of the master device in order to acquire the handover pre-measurement data may be referred to the three exemplary methods described above with respect to the apparatus on the master device side, and is not repeatedly described in detail here.

The handover pre-measurement data transmission unit 906 may be configured to transmit the acquired handover pre-measurement data to the master device, such that the master device determines the relationship between the movement range of the slave device and the effective signal coverage of the master device (i.e., the above three situations), thereby determining whether to transmit the handover measurement request to the slave device.

Preferably, the handover measurement request reception unit 908 may be further configured to receive the handover measurement request transmitted by the master device according to a determination result, the determination result being made by the master device according to the handover pre-measurement data, and including whether the slave device is to perform handover from the master device to another device and/or a candidate handover target set for the slave device. The handover measurement request may preferably include measurement configuration information, for example, at least one of measurement content (including position status information, a link quality and the like) and the candidate handover target set. The candidate handover target set may include a base station, a device discoverable by the master device and a device determined by the master device according to RRM measurement for the base station.

The handover measurement control unit 910 may have a functional configuration corresponding to the above cases regarding whether the control plane service is maintained between the slave device and the handover target device. In the following, functional configuration examples of the handover measurement control unit in the apparatus on the slave device side are described in detail with reference to FIGS. 10 and 11.

Figure 10:
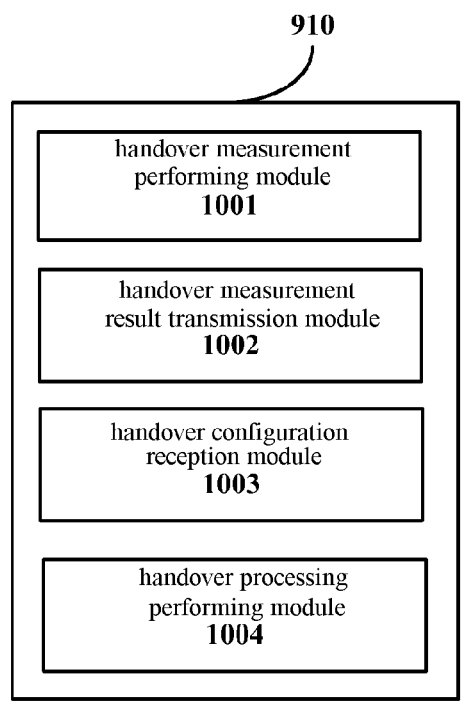
FIG. 10 is a block diagram illustrating a functional configuration example of a handover measurement control unit in the apparatus on the slave device side according to an embodiment of the present disclosure.

FIG. 10 is a block diagram illustrating a functional configuration example of a handover measurement control unit in the apparatus on the slave device side according to an embodiment of the present disclosure.

As shown in FIG. 10, the handover measurement control unit 910 may include a handover measurement performing module 1001, a handover measurement result transmission module 1002, a handover configuration reception module 1003, and a handover processing performing module 1004. In the following, functional configuration examples of respective module are described in detail.

The handover measurement performing module 1001 may be configured to perform handover measurement according to the handover measurement request. Specifically, the handover measurement performing module 1001 may perform handover measurement on each of the devices in the candidate handover target set according to the handover measurement request. A specific procedure of performing the handover measurement is the same as that in the conventional technology, and is not repeatedly described herein.

The handover measurement result transmission module 1002 may be configured to transmit a handover measurement result to the master device.

The handover configuration reception module 1003 may be configured to receive handover configuration information from the master device, where the handover configuration information is made by the master device according to a handover request response from a handover target device, the handover target device being determined by the master device according to the handover measurement result.

Specifically, as described above, the master device determines the handover target device for the slave device among the candidate handover target set according to the received handover measurement result, and transmits the handover request to the determined handover target device.

It should be understood that, in a case that the control plane service is not maintained between the slave device and the handover target device, the master device is required to transmit the handover request to the handover target device and receive a response to the handover request (including whether the slave device is allowed to access to the handover target device) from the handover target device, then the master device transmits the handover configuration information to the slave device according to the response. Alternatively, as another example, the slave device determines the handover target device according to the handover measurement result and notifies the handover target device to the master device, and then the master device transmits the handover request to the handover target device.

The handover processing performing module 1004 may be configured to perform handover processing with respect to the handover target device according to the received handover configuration information, that is, firstly establishing a connection between the slave device and the handover target device, and then disconnecting the connection between the slave device and the master device after the master device and the handover target device finishing the data integrity service for the target slave device.

It should be understood that, the functional configuration example of the handover measurement control unit 910 shown in FIG. 10 corresponds to the above functional configuration example of the handover measurement control unit on the master device side in the case where the control plane service is not maintained between the slave device and the handover target device (for example, the functional configuration example of the handover measurement control unit 308 as shown in FIG. 6), thus some omitted details in this functional configuration example may be referred to the corresponding description above.

Next, another functional configuration example of the handover measurement control unit in the apparatus on the slave device side in the wireless communication system according to an embodiment of the present disclosure is described with reference to FIG. 11, which is a block diagram illustrating another functional configuration example of a handover measurement control unit in the apparatus on the slave device side in the wireless communication system according to an embodiment of the present disclosure. It is to be noted that, this example corresponds to the case where the control plane service is maintained between the slave device and the handover target device.

Figure 11:
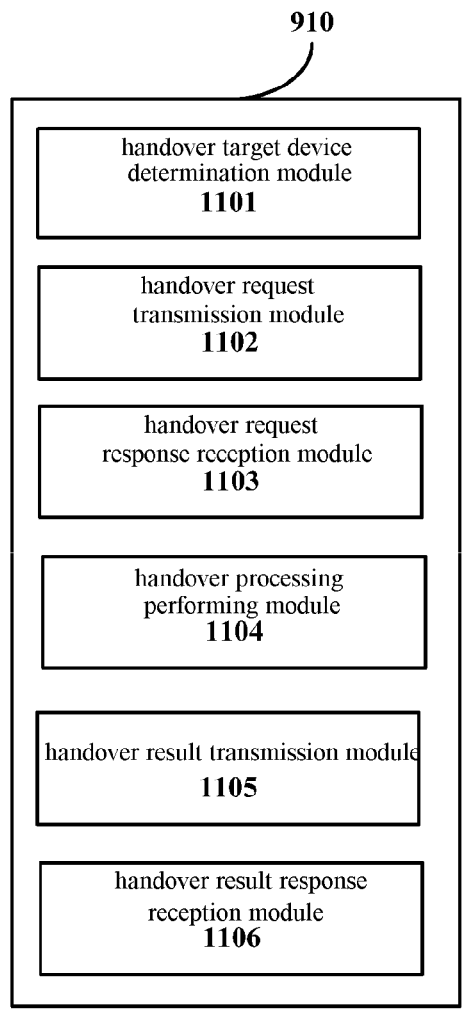
FIG. 11 is a block diagram illustrating another functional configuration example of a handover measurement control unit in the apparatus on the slave device side according to an embodiment of the present disclosure.

As shown in FIG. 11, the handover measurement control unit 910 may include a handover target device determination module 1101, a handover request transmission module 1102, a handover request response reception module 1103, a handover processing performing module 1104, a handover result transmission module 1105, and a handover result response reception module 1106. In the following, functional configuration examples of respective modules are described in detail.

The handover target device determination module 1101 may be configured to determine a handover target device according to the received handover measurement request. Specifically, the handover target device determination module 1101 may be configured to perform handover measurement for each of the devices in the candidate handover target set according to the received handover measurement request, and determine the handover target device to which the slave device is to access according to a result of the handover measurement. It should be understood that, the handover target device determination module 1101 is optional, and the handover target device may be also determined on the master device side.

The handover request transmission module 1102 may be configured to transmit a handover request to the handover target device. It should be understood that, in this example, since the control plane service is maintained between the slave device and the handover target device, the slave device may directly transmit the handover request to the handover target device.

The handover request response reception module 1103 may be configured to receive a handover request response from the handover target device. Specifically, the handover target device may determine whether the slave device is allowed to access to the handover target device according to the received handover request in combination with its own configuration, and respond to the handover request from the slave device.

The handover processing performing module 1104 may be configured to perform handover processing with respect to the handover target device according to the received handover request response, i.e., to establish a connection with the handover target device.

The handover result transmission module 1105 may be configured to transmit a handover result of the handover processing to the master device. The handover result transmission module 1105 may transmit to the master device the handover result indicating whether the slave device successfully accesses to the handover target device, such that the master device may perform corresponding processing according to the handover result.

The handover result response reception module 1106 may be configured to receive a handover result response returned by the master device according to processing for the handover result. Specifically, upon reception of the handover result, the master device may perform corresponding handover result processing, including processing performed by the master device and the handover target device for ensuring the data integrity of the slave device and disconnecting the connection between the master device and the slave device, and transmits the processing result to the slave device as a response to the handover result.

It should be understood that, the functional configuration example of the handover measurement control unit 910 shown in FIG. 11 corresponds to the above functional configuration example of the handover measurement control unit on the master device side in the case where the control plane service is maintained between the slave device and the handover target device (for example, the functional configuration example of the handover measurement control unit 308 as shown in FIG. 7), thus, some omitted details in this functional configuration example may be referred to the corresponding description above.

Corresponding to the above functional configuration examples of the apparatuses on the master device side and the slave device side in the wireless communication system, here a functional configuration example of an apparatus on the handover target device side according to an embodiment of the present disclosure is described with reference to FIG. 12, which is a block diagram illustrating a functional configuration example of an apparatus in a wireless communication system according to an embodiment of the present disclosure.

Figure 12:
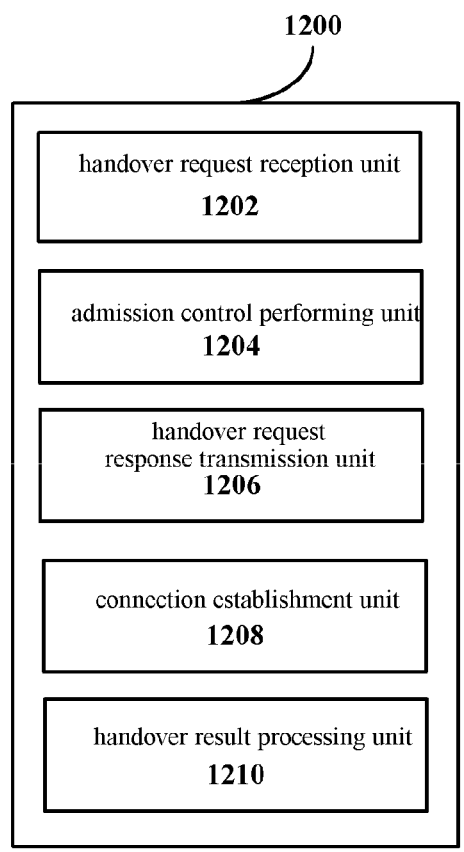
FIG. 12 is a block diagram illustrating a functional configuration example of an apparatus in a wireless communication system according to an embodiment of the present disclosure.

As shown in FIG. 12, an apparatus 1200 may include a handover request reception unit 1202, an admission control performing unit 1204, a handover request response transmission unit 1206, a connection establishment unit 1208, and a handover result processing unit 1210. The apparatus 1200 may be located on the handover target device side, and the handover target device may be determined by the master device or the slave device. In the following, functional configuration examples of respective units are described in detail.

The handover request reception unit 1202 may be configured to receive a handover request from a request source. As described above, the request source may be a master device or a slave device. In a case that the control plane service is not maintained between the slave device and the handover target device, the request source may be the master device, and in a case that the control plane service is maintained between the slave device and the handover target device, the request source may be the slave device.

The admission control performing unit 1204 may be configured to perform admission control according to the received handover request to determine whether the slave device is able to perform handover to a device where the apparatus 1200 is located. A specific processing procedure of the admission control is the same as that in the conventional technology, and is not repeatedly described herein.

The handover request response transmission unit 1206 may be configured to transmit a response to the handover request to the request source according to a result of the admission control, in order to inform the request source whether the slave device is allowed to access to the handover target device.

The connection establishment unit 1208 may be configured to establish a connection with the slave device according to the result of the admission control.

The handover result processing unit 1210 may be configured to perform handover result processing according to the handover result regarding establishment condition of connection. Preferably, the handover result processing may include the processing performed by the handover target device and the master device for ensuring the data integrity of the slave device.

It should be understood that, although functional configuration examples of the apparatus on the master device side, the apparatus on the slave device side, and the apparatus on the handover target device side in the wireless communication system are described above with reference to drawings, these functional configuration examples are only exemplary but not limitations, and those skilled in the art can make modifications to the above functional configuration examples according to the principle of the present disclosure, for example, addition, deletion, alternation, combination and sub-combination can be made to the above functional modules, and all of these modifications are naturally considered to fall within the scope of the present disclosure.

Further, it should be understood that, the apparatus on the master device side, the apparatus on the slave device side, and the apparatus on the handover target device side may be respectively implemented as processing circuits such as processors, processing chips or the like in the master device, the slave device, and the handover target device.

In the following, signaling flows for handover pre-measurement and handover are described in conjunction with the above functional configuration examples of the apparatus on the master device side, the apparatus on the slave device side, and the apparatus on the handover target device side.

Firstly, a signaling procedure for handover pre-measurement according to an embodiment of the disclosure is described with reference to FIG. 13, which is a schematic diagram illustrating a signaling flow for handover pre-measurement according to an embodiment of the present disclosure.

Figure 13:
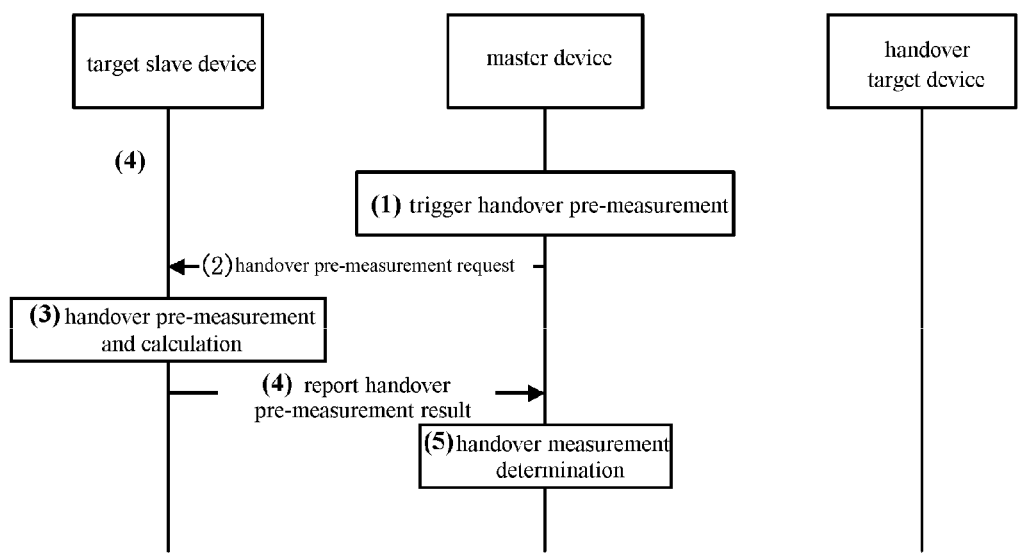
FIG. 13 is a schematic diagram illustrating a signaling flow for handover pre-measurement according to an embodiment of the present disclosure.

As shown in FIG. 13, first, the master device triggers the handover pre-measurement according to a predetermined trigger event in (1), and transmits a handover pre-measurement request to the slave device in (2). Next, the handover pre-measurement and calculation are performed on the slave device side in (3), and a result of the handover pre-measurement (i.e., the handover pre-measurement data) is reported to the master device in (4). Then, in (5), the master device performs handover measurement determination according to the result of the handover pre-measurement, in order to determine whether to initiate the handover measurement for the slave device.

It should be understood that, the signaling flow for the handover pre-measurement as shown in FIG. 13 is only exemplary but not limitation. For example, the handover pre-measurement calculation in (3) may also be performed on the master device side. Particularly, in a case that the handover pre-measurement calculation is performed based on retransmission times of HARQ, the transmission of the handover pre-measurement request in (2) and reporting of the result of the handover pre-measurement in (4) may also be omitted. That is, the handover pre-measurement processing may be performed entirely on the master device side without participation of the slave device.

Figure 14:
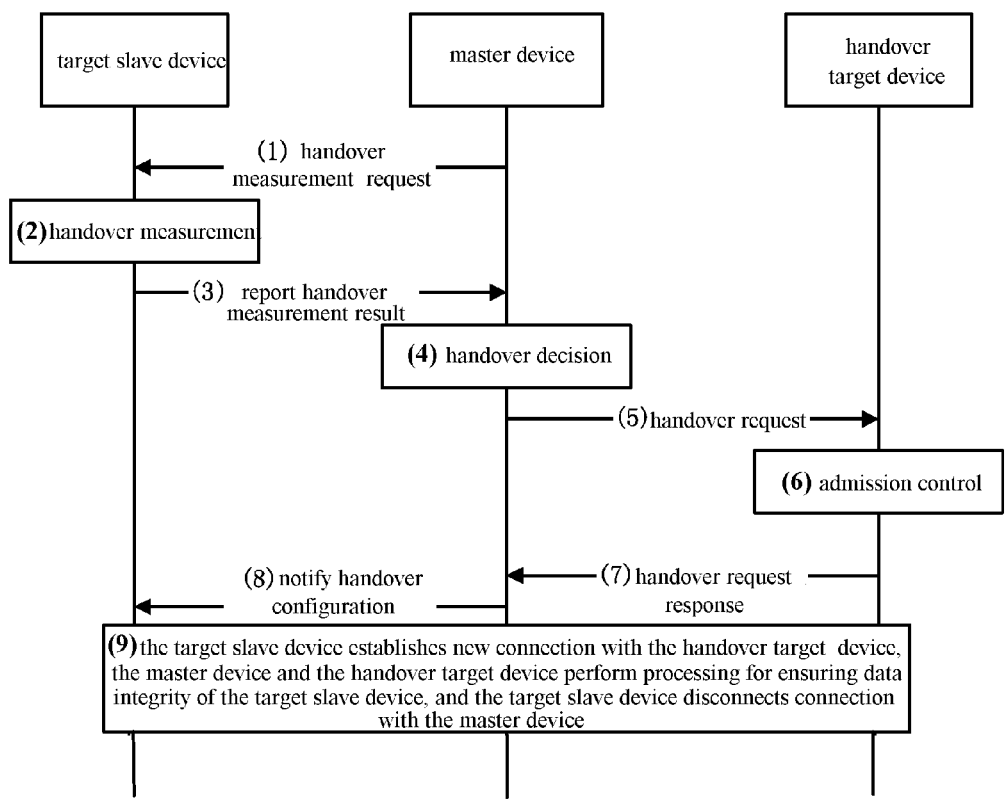
FIG. 14 is a schematic diagram illustrating an example of a handover signaling flow according to an embodiment of the present disclosure.

FIG. 14 is a schematic diagram illustrating a handover signaling flow according to an embodiment of the present disclosure.

As shown in FIG. 14, first, the master device transmits a handover measurement request to the slave device in (1), then the handover measurement is performed on the slave device side in (2), and the slave device reports a result of the handover measurement to the master device in (3). Next, the master device makes a handover decision to select the handover target device in (4), and transmits a handover request to the selected handover target device in (5). Next, the handover target device performs admission control to determine whether the target device is allowed to access to the handover target device in (6), and transmits a handover request response to the master device according to a result of the admission control in (7). In (8), the master device notifies the slave device of handover configuration information according to the received handover request response. Then, in (9), the slave device establishes a new connection with the handover target device, the master device and the handover target device operate together to perform the processing for ensuring the data integrity of the slave device, and the slave device disconnects the connection with the master device. Thus, the entire handover procedure is completed.

It should be understood that, the above handover signaling flow corresponds to the case where the control plane service is not maintained between the slave device and the handover target device, thus, before the slave device establishes the connection with the handover target device, the master device is required to perform signaling forwarding between the handover target device and the slave device.

Figure 15:
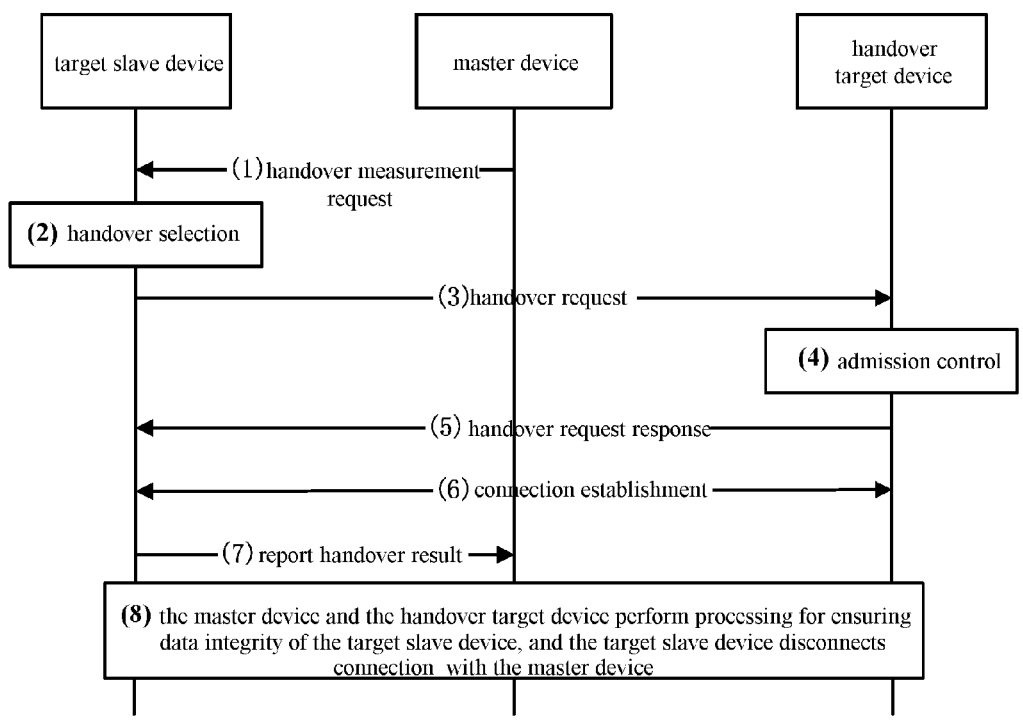
FIG. 15 is a schematic diagram illustrating another example of a handover signaling flow according to an embodiment of the present disclosure.

FIG. 15 is a schematic diagram illustrating a handover signaling flow according to another embodiment of the present disclosure.

As shown in FIG. 15, first, the master device transmits a handover measurement request to the slave device in (1), and then the slave device performs handover selection according to the handover measurement request in order to select a suitable handover target device in (2), and transmits a handover request to the handover target device in (3). The handover target device performs admission control according to the received handover request in (4), and transmits a handover request response to the slave device which acts as a request source in (5). Then, a connection between the slave device and the handover target device is established in (6), and after establishment of the connection, the slave device reports the handover result to the master device in (7). In (8), upon reception of the handover result, the master device and the handover target device perform the processing for ensuring the data integrity of the slave device, and the connection between the master device and the slave device is disconnected. It should be understood that, this handover signaling procedure corresponds to the case where the control plane service is maintained between the slave device and the handover target device.

It is to be noted here that, the above described signaling flows respectively correspond to the above functional configuration examples of respective apparatuses. Therefore, some omitted details herein may be referred to the corresponding description above, and are not repeatedly described here.

Further, it is also to be noted that, the signaling flows described herein are only examples, and those skilled in the art may make modifications to the above signaling flows according to the principle of the present disclosure, and all such modifications are considered to fall within the scope of the present disclosure.

Figure 16:
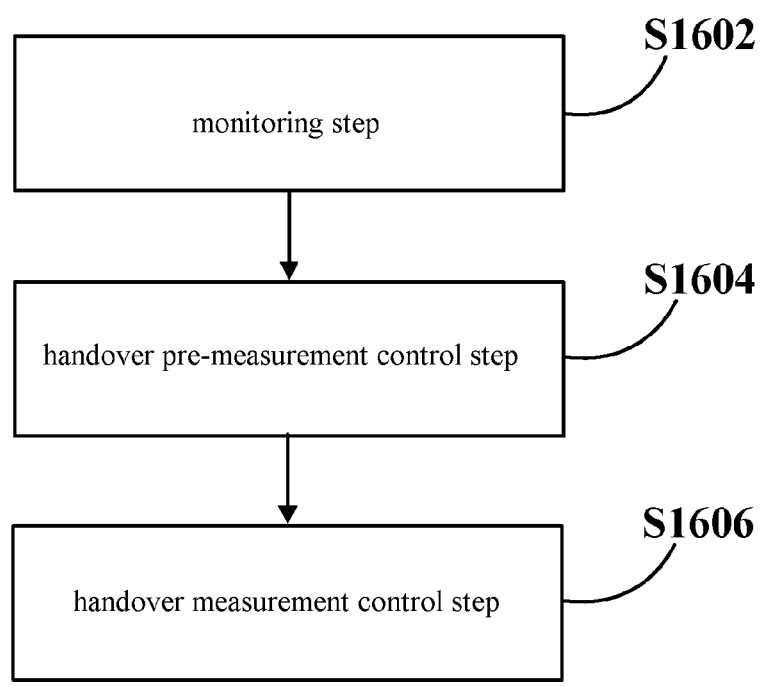
FIG. 16 is a flow chart illustrating a procedure example of a method applied on a master device side in a wireless communication system according to an embodiment of the disclosure.

FIG. 16 is a flow chart illustrating a procedure example of a method applied on a master device side in a wireless communication system according to an embodiment of the disclosure.

As shown in FIG. 16, the method may include a monitoring step S1602, a handover pre-measurement control step S1604 and a handover measurement control step S1606.

In the monitoring step S1602, a predetermined trigger event regarding variation in status of the master device is monitored.

In the handover pre-measurement control step S1604, handover pre-measurement for the one or more slave devices is controlled in response to the predetermined trigger event.

Next, in the handover measurement control step S1606, handover measurement for the one or more slave devices is controlled according to a result of the handover pre-measurement.

Figure 17:
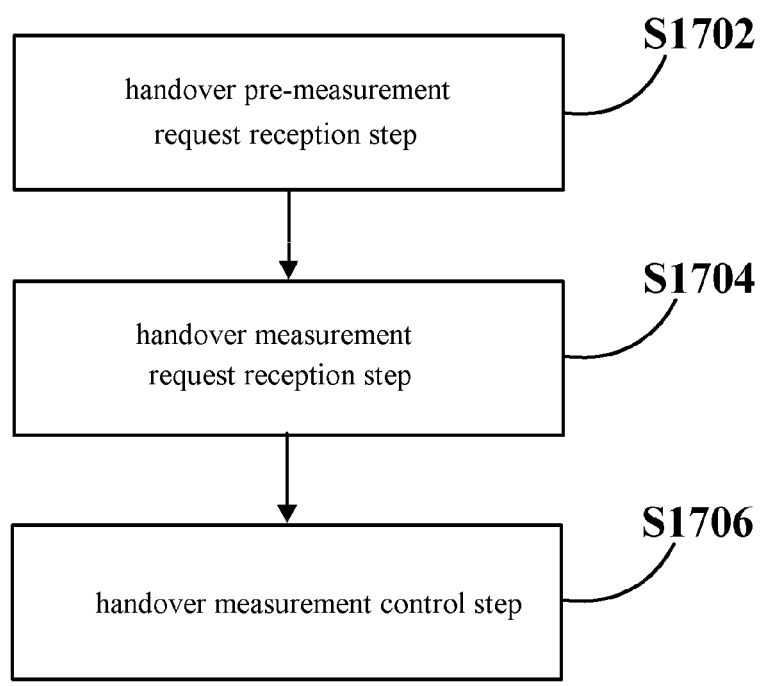
FIG. 17 is a flow chart illustrating a procedure example of a method applied on a slave device side in a wireless communication system according to an embodiment of the disclosure.

FIG. 17 is a flow chart illustrating a procedure example of a method applied on a slave device side in a wireless communication system according to an embodiment of the disclosure.

As shown in FIG. 17, the method may include a handover pre-measurement request reception step S1702, a handover measurement request reception step S1704, and a handover measurement control step S1706.

In the handover pre-measurement request reception step S1702, a handover pre-measurement request transmitted by the master device in response to a predetermined trigger event regarding variation in status of the master device is received.

Next, in the handover measurement request reception step S1704, a handover measurement request transmitted by the master device according to handover pre-measurement data is received, the handover pre-measurement data being acquired by performing statistical analysis on relationship between a movement range of the slave device and an effective signal coverage of the master device based on a response of the slave device to the handover pre-measurement request.

In the handover measurement control step S1706, handover measurement is controlled according to the handover measurement request.

Figure 18:
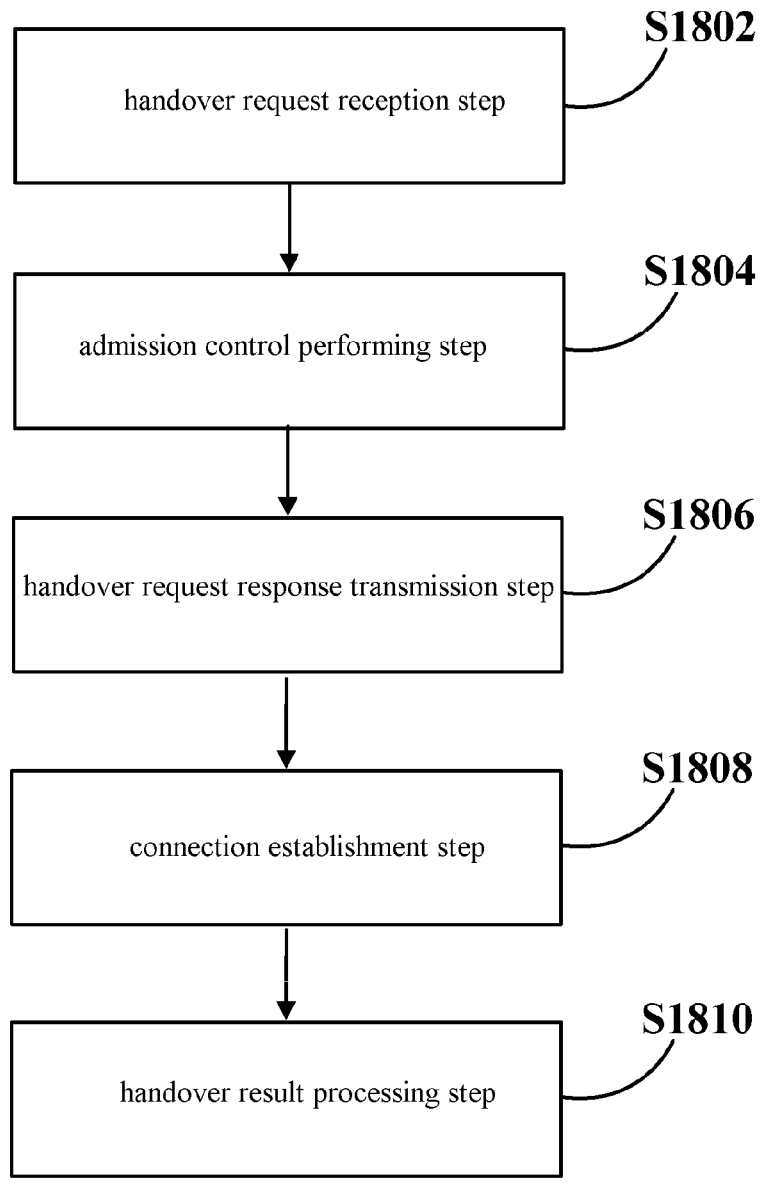
FIG. 18 is a flow chart illustrating a procedure example of a method applied in a wireless communication system according to an embodiment of the disclosure.

FIG. 18 is a flow chart illustrating a procedure example of a method applied in a wireless communication system according to an embodiment of the disclosure. The method is applied on the handover target device side.

As shown in FIG. 18, the method may include a handover request reception step S1802, an admission control performing step S1804, a handover request response transmission step S1806, a connection establishment step S1808, and a handover result processing step S1810.

In the handover request reception step S1802, a handover request from a request source is received, where the request source may be a master device or a slave device.

Next, in the admission control performing unit S1804, admission control is performed according to the handover request to determine whether the slave device is able to perform handover to the handover target device.

In the handover request response transmission step S1806, a response to the handover request is transmitted to the request source according to a result of the admission control.

In the connection establishment step S1808, a connection with the slave device is established according to the result of the admission control.

Then, in the handover result processing step S1810, handover result processing is performed according to a handover result regarding establishment condition of the connection.

It is to be noted that, although procedure examples of the methods applied in the wireless communication system according to the embodiments of the present disclosure are described above, these procedure examples are only exemplary but not limitation, and those skilled in the art can make modifications to the above procedure examples according to the principle of the present disclosure, for example, addition, deletion or combination can be made to the steps in respective embodiments, and all of these modifications fall within the scope of the present disclosure.

In addition, it is also to be noted that, the method embodiments described herein correspond to the above apparatus embodiments. Therefore, contents that are not described in detail in the method embodiments may be referred to corresponding descriptions in the apparatus embodiments, and are not repeatedly described herein.

Further, it is further provided an electronic device according to an embodiment of the present disclosure. The electronic device may include one or more processors which are configured to perform the methods or functions of corresponding units in the wireless communication system according to the embodiments of the present disclosure.

It should be understood that machine executable instructions in a storage medium and a program product according to an embodiment of the present disclosure may be configured to perform the methods corresponding to the apparatus embodiments, and hence the contents which are not described in detail here may be referred to corresponding descriptions above, and are not repeated here.

Accordingly, a storage medium on which the above program product storing machine executable instructions is carried is also included in the disclosure. The storage medium includes but not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 1900 illustrated in FIG. 19, which can perform various functions when various programs are installed thereon.

Figure 19:
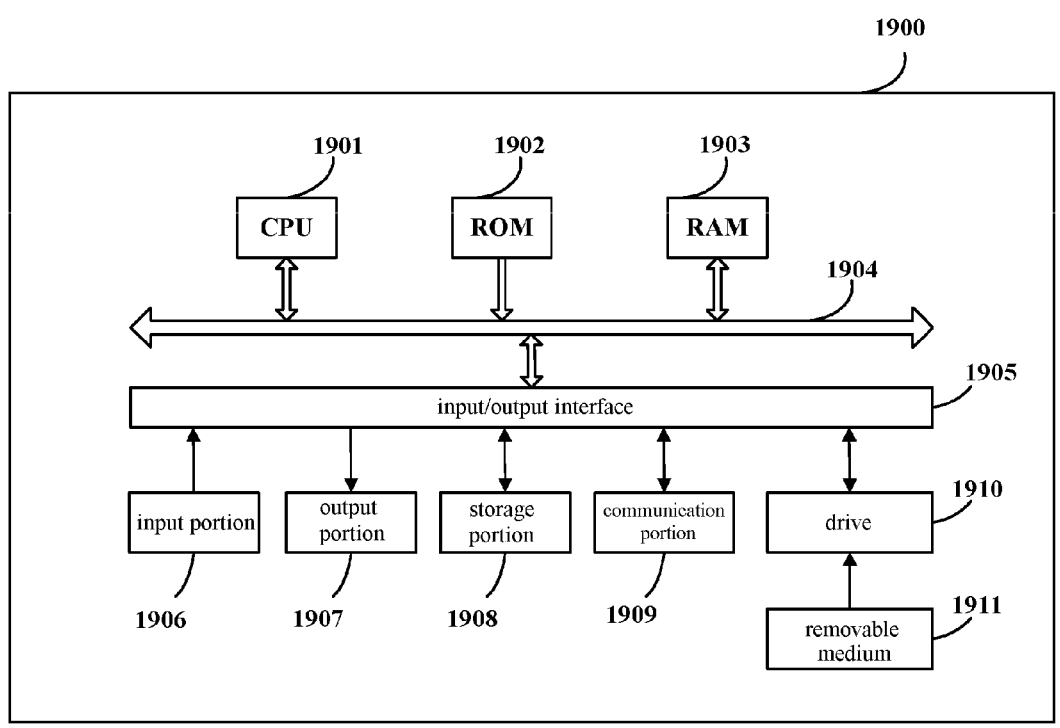
FIG. 19 is a block diagram illustrating an exemplary structure of a personal computer serving as an information processing device which can be adopted in an embodiment of the present disclosure.

In FIG. 19, a Central Processing Unit (CPU) 1901 performs various processes according to a program stored in a Read Only Memory (ROM) 1902 or loaded from a storage portion 1908 into a Random Access Memory (RAM) 1903 in which data required when the CPU 1901 performs the various processes is also stored as needed.

The CPU 1901, the ROM 1902 and the RAM 1903 are connected to each other via a bus 1904 to which an input/output interface 1905 is also connected.

The following components are connected to the input/output interface 1905: an input portion 1906 including a keyboard, a mouse, etc.; an output portion 1907 including a display, e.g., a Cathode Ray Tube (CRT), a Liquid Crystal Display (LCD), etc., a speaker, etc.; a storage portion 1908 including a hard disk, etc.; and a communication portion 1909 including a network interface card, e.g., an LAN card, a modem, etc. The communication portion 1909 performs a communication process over a network, e.g., the Internet.

A drive 1910 is also connected to the input/output interface 1905 as needed. A removable medium 1911, e.g., a magnetic disk, an optical disk, an magneto optical disk, a semiconductor memory, etc., can be installed on the drive 1910 as needed so that a computer program fetched therefrom can be installed into the storage portion 1908 as needed.

In the case that the foregoing series of processes are performed in software, a program constituting the software is installed from a network, e.g., the Internet, etc., or a storage medium, e.g., the removable medium 1911, etc.

Those skilled in the art shall appreciate that such a storage medium will not be limited to the removable medium 1911 illustrated in FIG. 19 in which the program is stored and which is distributed separately from the apparatus to provide a user with the program. Examples of the removable medium 1911 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1902, a hard disk included in the storage portion 1908, etc., in which the program is stored and which is distributed together with the apparatus including the same to the user.

In the following, application examples of the present disclosure are described with reference to FIGS. 20 and 21.

First Application Example

Figure 20:
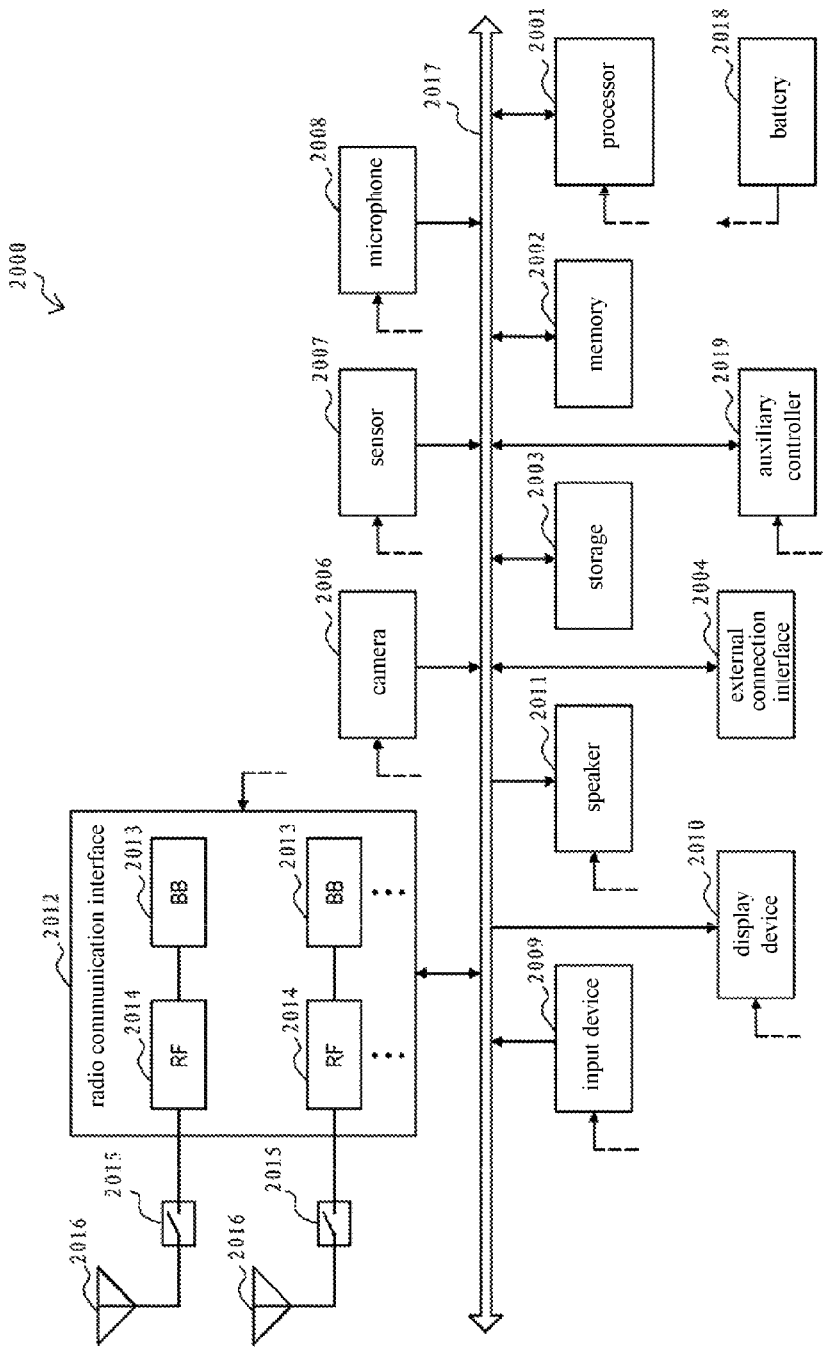
FIG. 20 is a block diagram illustrating an example of a schematic configuration of a smartphone to which the technology of the present disclosure may be applied.

FIG. 20 is a block diagram illustrating an example of a schematic configuration of a smartphone to which the technology of the present disclosure may be applied. The smartphone 2000 includes a processor 2001, a memory 2002, a storage 2003, an external connection interface 2004, a camera 2006, a sensor 2007, a microphone 2008, an input device 2009, a display device 2010, a speaker 2011, a radio communication interface 2012, one or more antenna switches 2015, one or more antennas 2016, a bus 2017, a battery 2018, and an auxiliary controller 2019.

The processor 2001 may be, for example, a CPU or a system on a chip (SoC), and controls functions of an application layer and another layer of the smartphone 2000. The memory 2002 includes RAM and ROM, and stores a program that is executed by the processor 2001, and data. The storage 2003 may include a storage medium such as a semiconductor memory and a hard disk. The external connection interface 2004 is an interface for connecting an external device such as a memory card and a universal serial bus (USB) device to the smartphone 2000.

The camera 2006 includes an image sensor such as a charge coupled device (CCD) and a complementary metal oxide semiconductor (CMOS), and generates a captured image. The sensor 2007 may include a group of sensors such as a measurement sensor, a gyro sensor, a geomagnetic sensor, and an acceleration sensor. The microphone 2008 converts sounds that are input to the smartphone 2000 to audio signals. The input device 2009 includes, for example, a touch sensor configured to detect touch onto a screen of the display device 2010, a keypad, a keyboard, a button, or a switch, and receives an operation or an information input from a user. The display device 2010 includes a screen such as a liquid crystal display (LCD) and an organic light-emitting diode (OLED) display, and displays an output image of the smartphone 2000. The speaker 2011 converts audio signals that are output from the smartphone 2000 to sounds.

The radio communication interface 2012 supports any cellular communication scheme such as LTE and LTE-Advanced, and performs radio communication. The radio communication interface 2012 may typically include, for example, a BB processor 2013 and an RF circuit 2014. The BB processor 2013 may perform, for example, encoding/decoding, modulating/demodulating, and multiplexing/demultiplexing, and performs various types of signal processing for radio communication. Meanwhile, the RF circuit 2014 may include, for example, a mixer, a filter, and an amplifier, and transmits and receives radio signals via the antenna 2016. The radio communication interface 2012 may be a one chip module having the BB processor 2013 and the RF circuit 2014 integrated thereon. The radio communication interface 2012 may include multiple BB processors 2013 and multiple RF circuits 2014, as illustrated in FIG. 20. Although FIG. 20 illustrates the example in which the radio communication interface 2012 includes the multiple BB processors 2013 and the multiple RF circuits 2014, the radio communication interface 2012 may also include a single BB processor 2013 or a single RF circuit 2014.

Furthermore, in addition to a cellular communication scheme, the radio communication interface 2012 may support another type of radio communication scheme such as a short-distance wireless communication scheme, a near field communication scheme, and a wireless local area network (LAN) scheme. In that case, the radio communication interface 2012 may include the BB processor 2013 and the RF circuit 2014 for each radio communication scheme.

Each of the antenna switches 2015 switches connection destinations of the antennas 2016 among multiple circuits (such as circuits for different radio communication schemes) included in the radio communication interface 2012.

Each of the antennas 2016 includes a single or multiple antenna elements (such as multiple antenna elements included in an MIMO antenna), and is used for the radio communication interface 2012 to transmit and receive radio signals. The smartphone 2000 may include multiple antennas 2016, as illustrated in FIG. 20. Although FIG. 20 illustrates the example in which the smartphone 2000 includes the multiple antennas 2016, the smartphone 2000 may also include a single antenna 2016.

Furthermore, the smartphone 2000 may include the antenna 2016 for each radio communication scheme. In that case, the antenna switches 2015 may be omitted from the configuration of the smartphone 2000.

The bus 2017 connects the processor 2001, the memory 2002, the storage 2003, the external connection interface 2004, the camera 2006, the sensor 2007, the microphone 2008, the input device 2009, the display device 2010, the speaker 2011, the radio communication interface 2012, and the auxiliary controller 2019 to each other. The battery 2018 supplies power to blocks of the smartphone 2000 illustrated in FIG. 20 via feeder lines, which are partially shown as dashed lines in the figure. The auxiliary controller 2019 operates a minimum necessary function of the smartphone 2000, for example, in a sleep mode.

In the smartphone 2000 illustrated in FIG. 20, the reception unit, the transmission unit, the reception module and the transmission module described by using FIG. 4, and FIGS. 6 to 12 may be implemented by the radio communication interface 2012. At least a part of the functions may also be implemented by the processor 2001 or the auxiliary controller 2019.

Second Application Example

Figure 21:
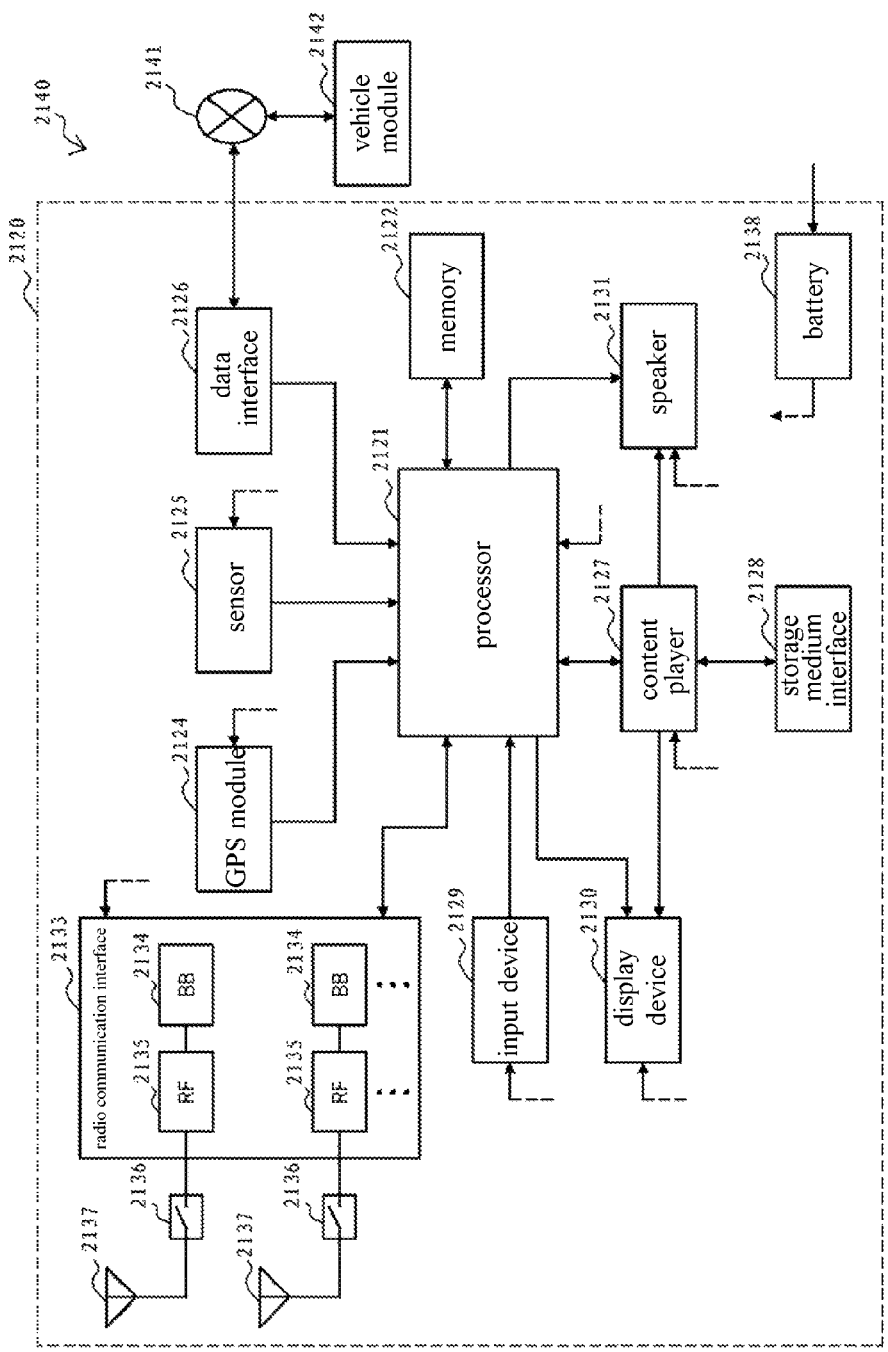
FIG. 21 is a block diagram illustrating an example of a schematic configuration of a car navigation apparatus to which the technology of the present disclosure may be applied.

FIG. 21 is a block diagram illustrating an example of a schematic configuration of a car navigation apparatus 2120 to which the technology of the present disclosure may be applied. The car navigation apparatus 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a radio communication interface 2133, one or more antenna switches 2136, one or more antennas 2137, and a battery 2138.

The processor 2121 may be, for example, a CPU or a SoC, and controls a navigation function and another function of the car navigation apparatus 2120. The memory 2122 includes RAM and ROM, and stores a program that is executed by the processor 2121, and data.

The GPS module 2124 uses GPS signals received from a GPS satellite to measure a position (such as latitude, longitude, and altitude) of the car navigation apparatus 2120. The sensor 2125 may include a group of sensors such as a gyro sensor, a geomagnetic sensor, and an air pressure sensor. The data interface 2126 is connected to, for example, an in-vehicle network 2141 via a terminal that is not shown, and acquires data generated by the vehicle, such as vehicle speed data.

The content player 2127 reproduces content stored in a storage medium (such as a CD and a DVD) that is inserted into the storage medium interface 2128. The input device 2129 includes, for example, a touch sensor configured to detect touch onto a screen of the display device 2130, a button, or a switch, and receives an operation or an information input from a user. The display device 2130 includes a screen such as a LCD or an OLED display, and displays an image of the navigation function or content that is reproduced. The speaker 2131 outputs sounds of the navigation function or the content that is reproduced.

The radio communication interface 2133 supports any cellular communication scheme such as LTE and LTE-Advanced, and performs radio communication. The radio communication interface 2133 may typically include, for example, a BB processor 2134 and an RF circuit 2135. The BB processor 2134 may perform, for example, encoding/decoding, modulating/demodulating, and multiplexing/demultiplexing, and performs various types of signal processing for radio communication. Meanwhile, the RF circuit 2135 may include, for example, a mixer, a filter, and an amplifier, and transmits and receives radio signals via the antenna 2137. The radio communication interface 2133 may also be a one chip module that has the BB processor 2134 and the RF circuit 2135 integrated thereon. The radio communication interface 2133 may include the multiple BB processors 2134 and the multiple RF circuits 2135, as illustrated in FIG. 21. Although FIG. 21 illustrates the example in which the radio communication interface 2133 includes the multiple BB processors 2134 and the multiple RF circuits 2135, the radio communication interface 2133 may also include a single BB processor 2134 or a single RF circuit 2135.

Furthermore, in addition to a cellular communication scheme, the radio communication interface 2133 may support another type of radio communication scheme such as a short-distance wireless communication scheme, a near field communication scheme, and a wireless LAN scheme. In that case, the radio communication interface 2133 may include the BB processor 2134 and the RF circuit 2135 for each radio communication scheme.

Each of the antenna switches 2136 switches connection destinations of the antennas 2137 among multiple circuits (such as circuits for different radio communication schemes) included in the radio communication interface 2133.

Each of the antennas 2137 includes a single or multiple antenna elements (such as multiple antenna elements included in an MIMO antenna), and is used for the radio communication interface 2133 to transmit and receive radio signals. The car navigation apparatus 2120 may include the multiple antennas 2137, as illustrated in FIG. 21. Although FIG. 21 illustrates the example in which the car navigation apparatus 2120 includes the multiple antennas 2137, the car navigation apparatus 2120 may also include a single antenna 2137.

Furthermore, the car navigation apparatus 2120 may include the antenna 2137 for each radio communication scheme. In that case, the antenna switches 2136 may be omitted from the configuration of the car navigation apparatus 2120.

The battery 2138 supplies power to blocks of the car navigation apparatus 2120 illustrated in FIG. 21 via feeder lines that are partially shown as dashed lines in the figure. The battery 2138 accumulates power supplied form the vehicle.

In the car navigation apparatus 2120 illustrated in FIG. 21, the reception unit, the transmission unit, the reception module and the transmission module described by using FIG. 4, and FIGS. 6 to 12 may be implemented by the radio communication interface 2133. At least a part of the functions may also be implemented by the processor 2121.

The technology of the present disclosure may also be realized as an in-vehicle system (or a vehicle) 2140 including one or more blocks of the car navigation apparatus 2120, the in-vehicle network 2141, and a vehicle module 2142. The vehicle module 2142 generates vehicle data such as vehicle speed, engine speed, and trouble information, and outputs the generated data to the in-vehicle network 2141.

Preferred embodiments of the disclosure have been described above with reference to the drawings, but the disclosure is not limited to the above examples of course. Those skilled in the art may devise various alternations and modifications within the scope of the appended claims, and it should be understood that these alternations and modifications would naturally fall within the technical scope of the disclosure.

For example, multiple functions included in one unit in the above embodiments may be implemented by separated apparatuses. Alternatively, multiple functions implemented by multiple units in the above embodiments may be implemented by separated apparatuses respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

The invention claimed is:

1. A method applied on a second device side in a wireless communication system, a first device being configured to provide a data forwarding service to the second device in the wireless communication system, the method comprising:
   receiving a handover pre-measurement request transmitted by the first device in response to a predetermined trigger event regarding variation in status of the first device;
   receiving a handover measurement request transmitted by the first device according to handover pre-measurement data, the handover pre-measurement data being acquired by performing statistical analysis on a relationship between a movement range of the second device and a signal coverage of the first device based on a response of the second device to the handover pre-measurement request; and
   controlling handover measurement according to the handover measurement request,
   wherein it is determined whether the second device is to perform handover from the first device to at least one of another device and a candidate handover target set for the second device, according to the handover pre-measurement data.

2. The method according to claim 1, wherein the predetermined trigger event comprises at least one of power adjustment, resource configuration adjustment, and mobility variation of the first device.

3. The method according to claim 1, wherein the handover pre-measurement request comprises at least one of measurement content, a measurement duration, and a measurement frequency.

4. The method according to claim 1, wherein the measurement content comprises at least one of positional status information of the first device and the second device and link quality information of a link between the first device and the second device, the positional status information and the link quality information being required to be measured and reported by the second device.

5. The method according to claim 1, further comprising:
   performing handover pre-measurement in response to the handover pre-measurement request so as to acquire the handover pre-measurement data; and
   transmitting the handover pre-measurement data to the first device,
   wherein the method further comprises:
   receiving the handover measurement request transmitted by the first device according to a determination result, the determination result being made by the first device according to the handover pre-measurement data, the determination result comprising whether the second device is to perform handover from the first device to another device, and/or a candidate handover target set for the second device.

6. The method according to claim 5, wherein the method further comprises:
   acquiring the handover pre-measurement data by performing statistical analysis on positional relationship between the first device and the second device and/or a channel condition measurement value regarding a channel between the first device and the second device.

7. The method according to claim 6, wherein the channel condition measurement value comprises at least one of a reference signal reception power (RSRP), a reference signal reception quality (RSRQ), a signal to interference-and-noise ratio (SINR) and a channel quality indicator (CQI).

8. The method according to claim 1, further comprising:
   performing handover measurement according to the handover measurement request;
   transmitting a handover measurement result to the first device;
   receiving handover configuration information from the first device, wherein the handover configuration information is made by the first device according to a handover request response from a handover target device, the handover target device being determined by the first device according to the handover measurement result; and
   performing handover processing with respect to the handover target device according to the handover configuration information.

9. The method according to claim 1, wherein the method further comprises:
   determining a handover target device according to the handover measurement request;
   transmitting a handover request to the handover target device;

receiving a handover request response from the handover target device;

performing handover processing with respect to the handover target device according to the handover request response;

transmitting a handover result of the handover processing to the first device; and receiving a handover result response returned by the first device according to processing for the handover result.

10. An apparatus in a wireless communication system, the apparatus comprising processing circuitry configured to:

receive a handover request from a request source, wherein the request source is a first device or a second device, and in the wireless communication system, the first device provides a data forwarding service to the second device;

perform admission control according to the handover request, to determine whether the second device is able to perform handover to a device where the apparatus is located;

transmit a response to the handover request to the request source according to a result of the admission control;

establish a connection with the second device according to the result of the admission control; and perform handover result processing according to a handover result regarding establishment condition of the connection.

\* \* \* \* \*